(12) United States Patent
Takenaka

(10) Patent No.: US 9,671,990 B2
(45) Date of Patent: Jun. 6, 2017

(54) IMAGE FORMING APPARATUS, INFORMATION PROCESSING METHOD, AND STORAGE MEDIUM FOR CONTROLLING DISPLAY OF AN OPERATION SCREEN BASED ON SETTING VALUES

(71) Applicant: CANON KABUSHIKI KAISHA, Tokyo (JP)

(72) Inventor: Yoko Takenaka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/656,326

(22) Filed: Mar. 12, 2015

(65) Prior Publication Data
US 2015/0261481 A1 Sep. 17, 2015

(30) Foreign Application Priority Data
Mar. 14, 2014 (JP) ................ 2014-051884

(51) Int. Cl.
*G06F 3/12* (2006.01)
*H04N 1/00* (2006.01)

(52) U.S. Cl.
CPC .......... *G06F 3/1285* (2013.01); *G06F 3/1204* (2013.01); *G06F 3/1257* (2013.01); *G06F 3/1271* (2013.01); *H04N 1/0035* (2013.01); *G06F 3/1205* (2013.01)

(58) Field of Classification Search
CPC .................................... G06F 3/1231
USPC ................................ 358/1.15, 1.13
See application file for complete search history.

(56) References Cited

U.S. PATENT DOCUMENTS

| | | | | |
|---|---|---|---|---|
| 2002/0126322 A1* | 9/2002 | Kadowaki | ............ | H04N 1/0035 358/440 |
| 2008/0304092 A1* | 12/2008 | Ebuchi | .................. | G06F 3/1204 358/1.13 |
| 2010/0281476 A1* | 11/2010 | Ebi | ....................... | G06F 3/1203 717/174 |
| 2011/0267636 A1* | 11/2011 | Kamasuka | ............ | G06F 3/1222 358/1.14 |

FOREIGN PATENT DOCUMENTS

| | | |
|---|---|---|
| JP | 2007124068 A | 5/2007 |
| JP | 2011008378 A | 1/2011 |
| JP | 2011084019 A | 4/2011 |
| JP | 2011123824 A | 6/2011 |
| JP | 2011233031 A | 11/2011 |

\* cited by examiner

*Primary Examiner* — Jacky X Zheng
(74) *Attorney, Agent, or Firm* — Canon U.S.A., Inc. IP Division

(57) ABSTRACT

An image forming apparatus includes a setting unit configured to set whether to use personal setting information stored for each user, and a reflection unit configured to reflect a setting value changed by an authenticated user to personal setting information of the authenticated user, in a case where using the personal setting information has been set by the setting unit, and to reflect the setting value changed by the authenticated user to common setting information shared by a plurality of users, in a case where not using the personal setting information has been set by the setting unit.

13 Claims, 29 Drawing Sheets

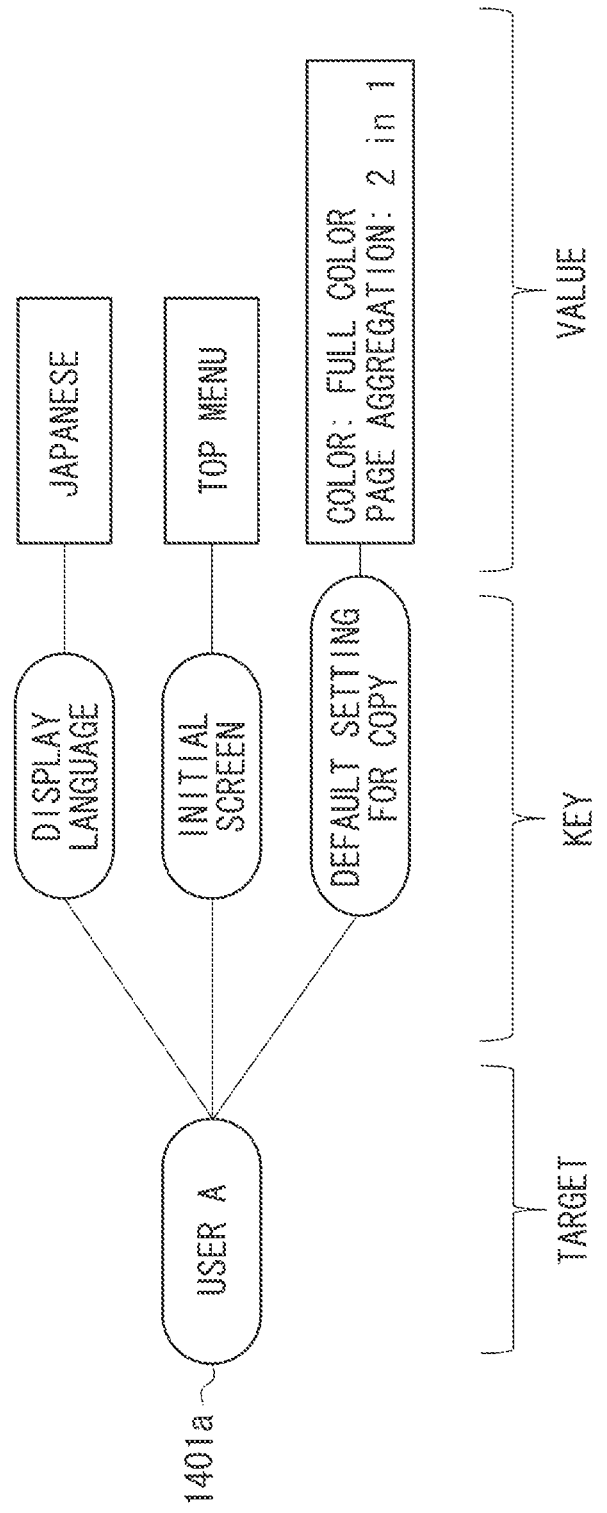

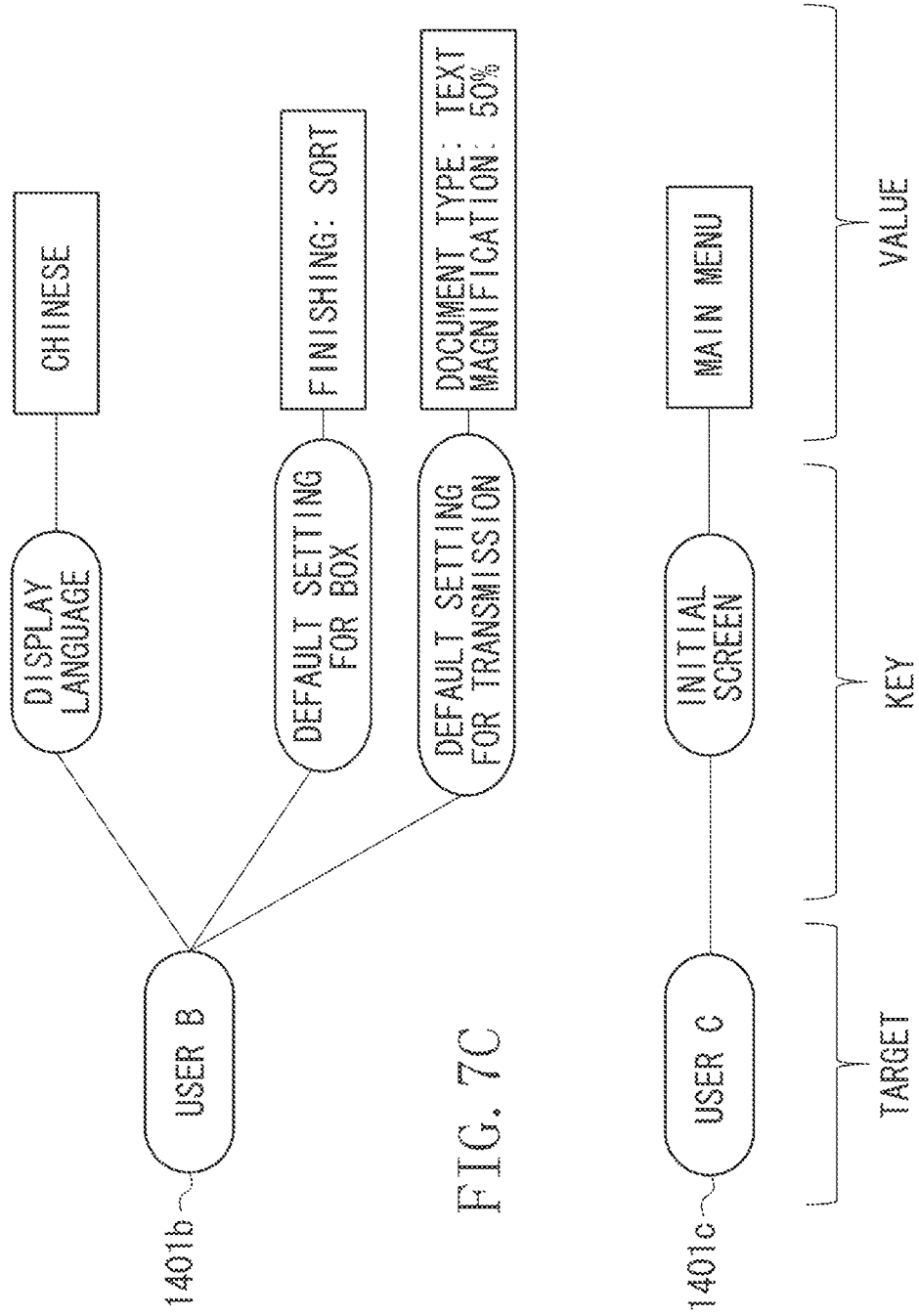

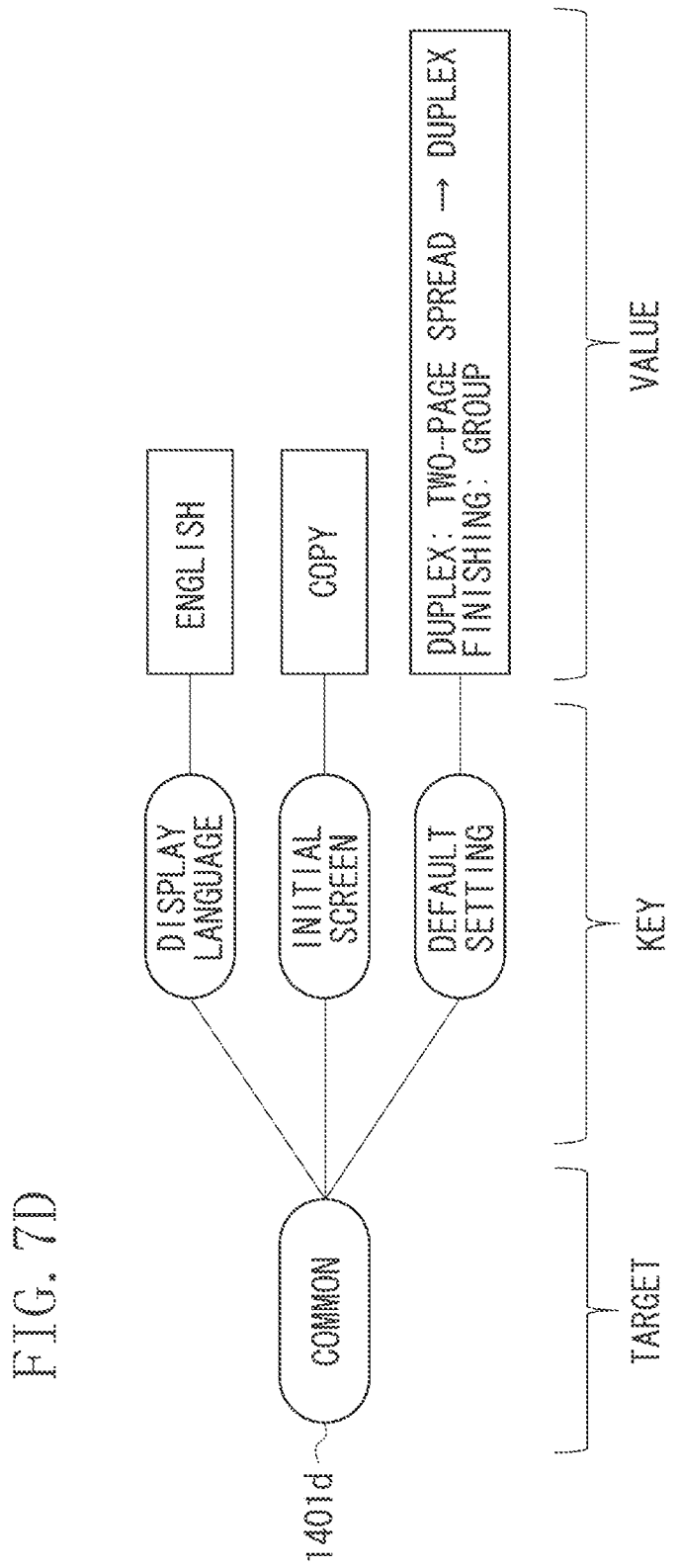

FIG. 9C

SET FOLLOWING AS DEFAULT SETTING?

AUTO
(COLOR)/MONOCHROME    100%    A4    1

DUPLEX            ▲ SINGLE SIDED  ▲ DUPLEX
DOCUMENT TYPE     ▲ TEXT 920
921
922

YES    NO

FIG. 10

<SETTING HISTORY>
SELECT HISTORY TO BE CALLED AND THEN PRESS [OK]

| AUTO (COLOR)/MONOCHROME | 100% | 1 | A4 |

DUPLEX ▲ SINGLE SIDED ▶ DUPLEX
DOCUMENT TYPE ▲ TEXT

HISTORY 1 | HISTORY 2 | HISTORY 3

YES | NO

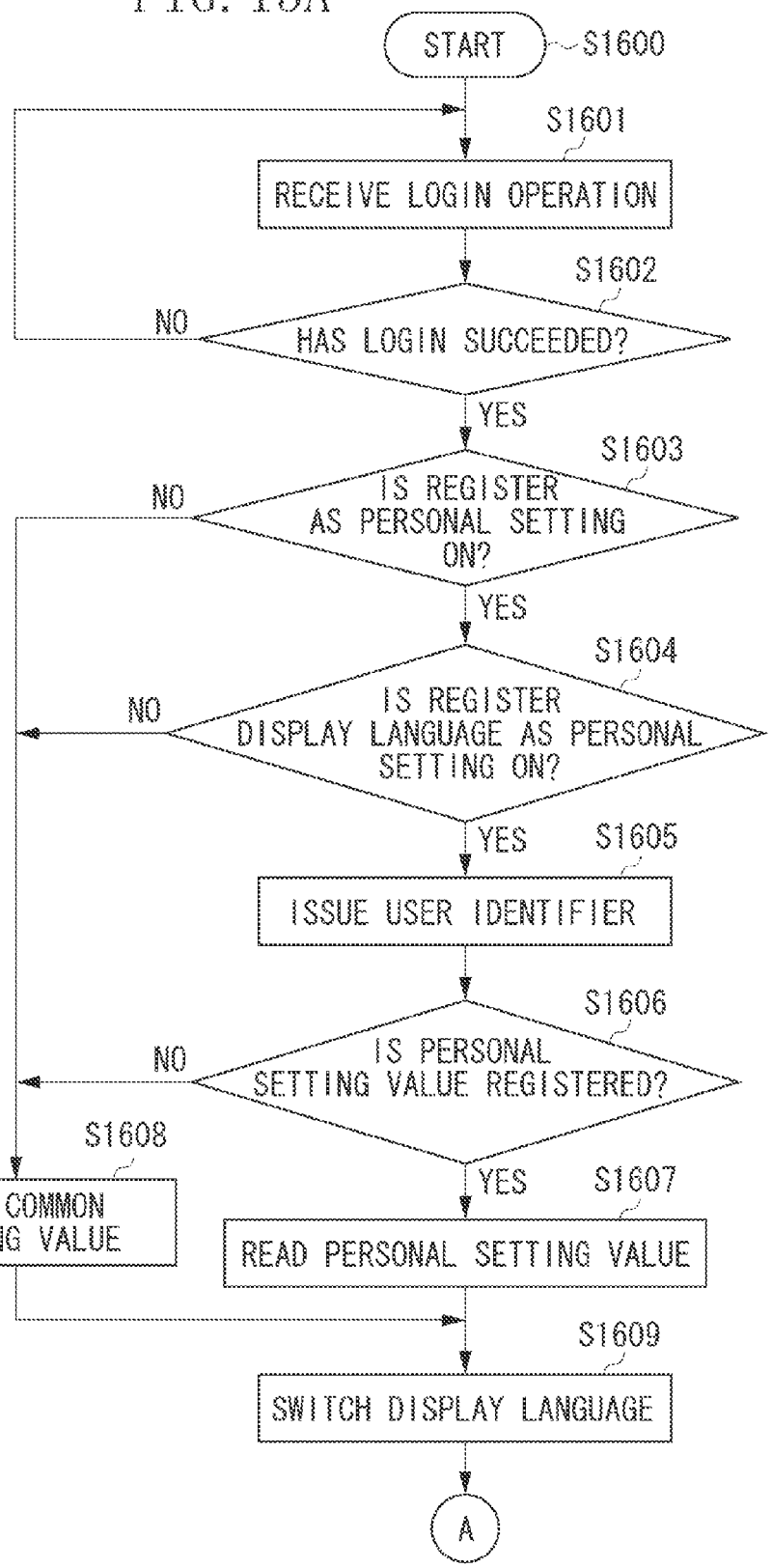

FIG. 17
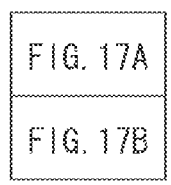
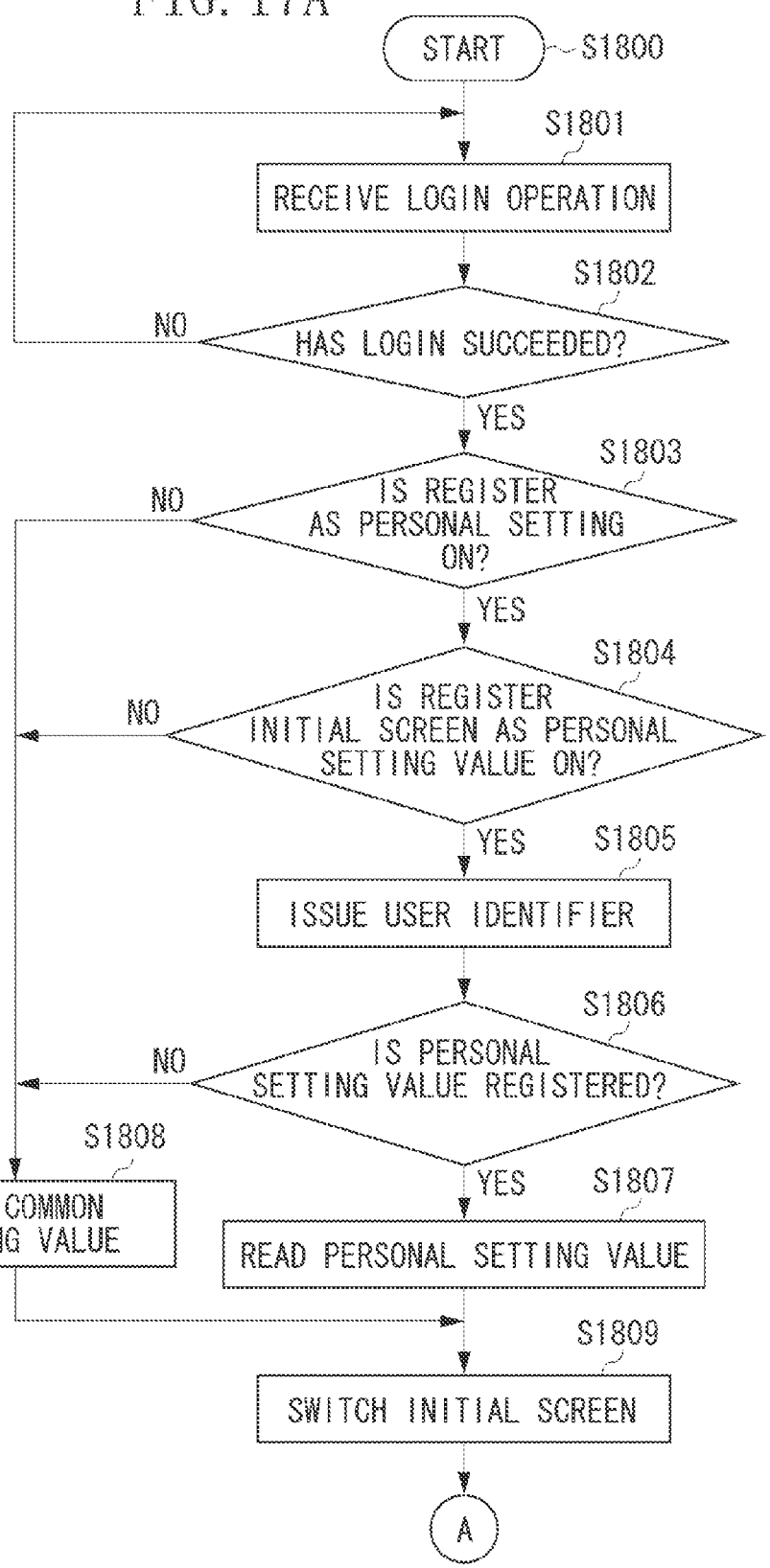
FIG. 17A

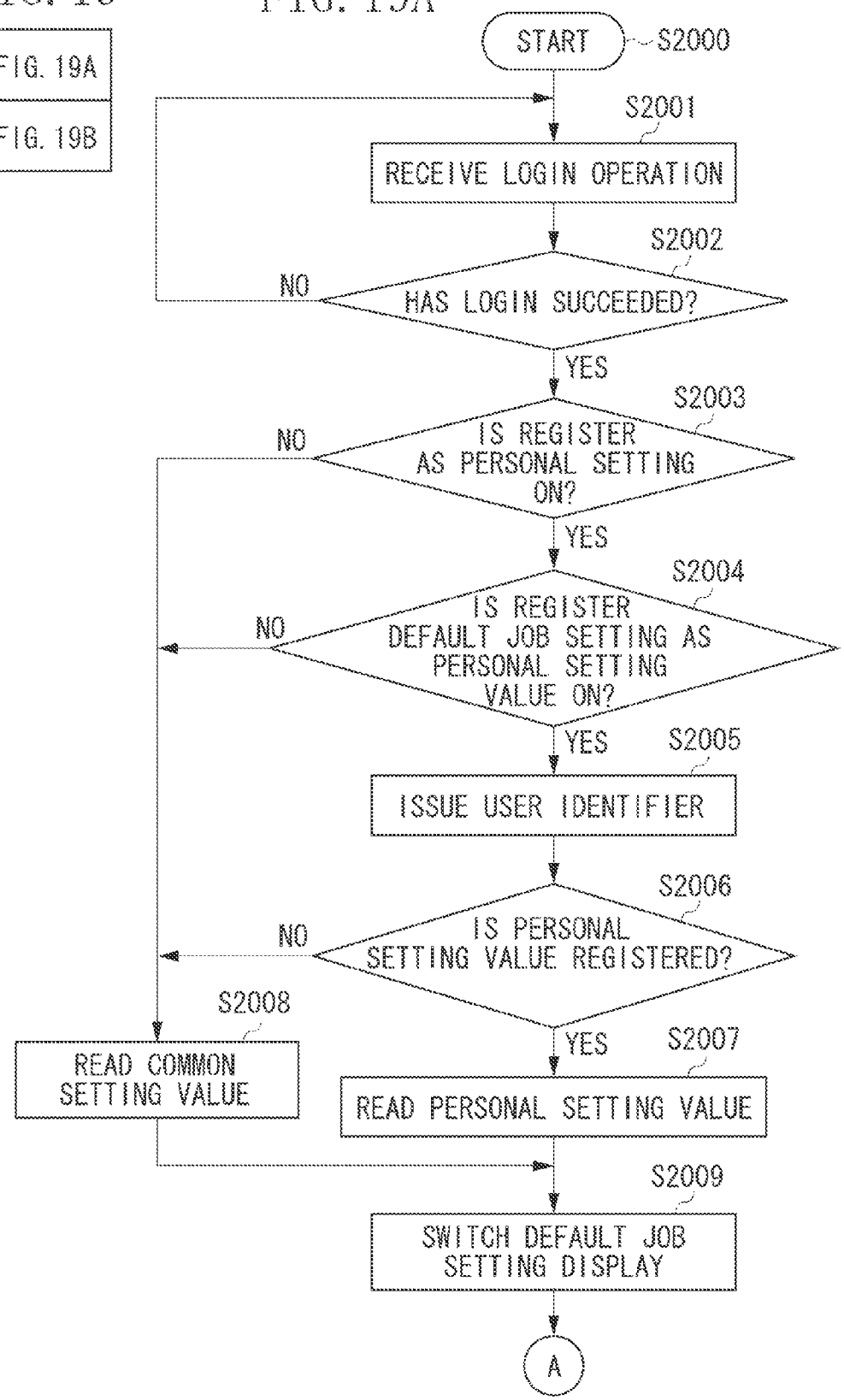

US 9,671,990 B2

IMAGE FORMING APPARATUS, INFORMATION PROCESSING METHOD, AND STORAGE MEDIUM FOR CONTROLLING DISPLAY OF AN OPERATION SCREEN BASED ON SETTING VALUES

BACKGROUND OF THE INVENTION

Field of the Invention

The present invention relates to an image forming apparatus, an information processing method, and a storage medium.

Description of the Related Art

Recently, an image forming apparatus has various functions, and user operations performed on the image forming apparatus has become highly complicated. Generally, the image forming apparatus is shared by a plurality of users. Thus, an auto-clear function is employed for automatically clearing a setting value when a predetermined period of time has elapsed after an user changed a setting. Thus, the next user can be prevented from using the previous settings for his or her operation without knowing. In such a configuration, a user each time has to select a desired setting screen from an initial menu of the image forming apparatus. Thus, even if a user has a frequently used setting value, the user has to go through a cumbersome procedure of setting in the same way every time.

To solve the issues described above, a customize function has been developed for enabling a user to freely set an initial setting value. However, since the conventional customize functions enables each user to freely customize the setting value as he or she desires, the following issue arises. For example, an administrator would want to set the initial screen, which is initially displayed after login, to be a "management screen" for managing usage records of other users. The customize function of enabling the initial screen to be set to "copy screen" by one user and to "main menu" by another user, might cause the image forming apparatus to be used in a way unwanted by the administrator. Consequently, the administrator would want to set restrictions for customizing, so that the apparatus is not used in a way unwanted by the administrator.

A technique disclosed in Japanese Patent Application Laid-Open No. 2011-84019 discusses a customize mode enabling a user to change operation keys in an operation screen as desired from an initial displayed state, and register the changed keys. The technique further enables a specific user, such as an administrator, to set a setting in such a manner that the display state of the operation key cannot be changed from the initial displayed state. Thus, with the technique, restriction can be set for customization by general users in terms of changing a specific display state of the operation key.

SUMMARY OF THE INVENTION

According to an aspect of the present invention, an image forming apparatus includes a setting unit configured to set whether to use personal setting information stored for each user, and a reflection unit configured to reflect a setting value changed by an authenticated user to personal setting information of the authenticated user, in a case where using the personal setting information has been set by the setting unit, and to reflect the setting value changed by the authenticated user to common setting information shared by a plurality of users, in a case where not using the personal setting information has been set by the setting unit.

Further features of the present invention will become apparent from the following description of exemplary embodiments (with reference to the attached drawings).

BRIEF DESCRIPTION OF THE DRAWINGS

FIGS. 7A, 7B, and 7C are diagrams each illustrating an example of personal setting information and FIG. 7D is a diagram illustrating an example of common setting information.

FIGS. 9A, 9B, and 9C are diagrams each illustrating an example of a copy job setting screen.

FIG. 10 is a diagram illustrating an example of a call screen for calling a history of a job setting.

FIG. 15 is a diagram including flowcharts of Figs. 15A and 15B. FIGS. 15A and 15B are flowchart illustrating an example of display language switching processing.

FIG. 17 is a diagram including flowcharts of Figs. 17A and 17B. FIGS. 17A and 17B are flowchart illustrating an example of initial screen switching processing.

FIG. 19 is a diagram including flowcharts of Figs. 19A and 19B. FIGS. 19A and 19B are flowchart illustrating an example of default job setting switching processing.

DESCRIPTION OF THE EMBODIMENTS

Exemplary embodiments of the present invention are described with reference to the drawings.

Figure 1:
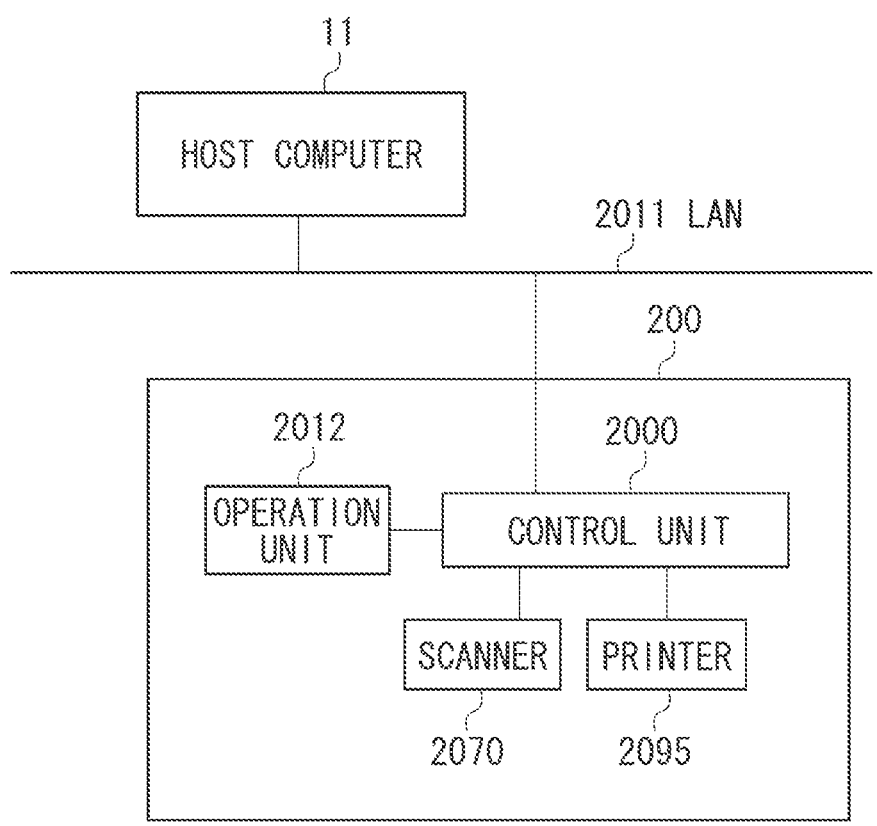
FIG. 1 is a diagram illustrating an example of a system configuration of an image output system.

FIG. 1 is a diagram illustrating an example of a system configuration of an image output system including a host computer 11 and an image forming apparatus 200. In the image output system illustrated in FIG. 1, the host computer 11 and the image forming apparatus 200 can communicate with each other by using a predetermined protocol via a local area network (LAN) 2011. Although a single image forming apparatus 200 is provided in the example illustrated in FIG. 1, the number of image forming apparatuses 200 may be more than one. Although the host computer 11 and the image forming apparatus 200 are separately provided in the example illustrated in FIG. 1, the host computer 11 and the image forming apparatus 200 may be provided as a single apparatus.

The image forming apparatus 200 includes a scanner 2070 as an image input device, a printer 2095 as an image output device, a control unit 2000, and an operation unit 2012 as a user interface. The scanner 2070, the printer 2095, and the operation unit 2012 are each connected to the control unit 2000 that is connected to a network, such as the LAN 2011 or the like.

The host computer 11 is an information processing apparatus that functions as a client machine, and includes a display device, a keyboard, a pointing device, and a computer main body. A central processing unit (CPU) of the host computer 11 loads an operating system (OS) program and various application programs onto a random access memory (RAM), and executes the program. The OS program and the various application programs are stored in an external storage device built-in the computer main body. Thus, the CPU of the host computer 11 implements functions of the host computer 11. The host computer 11 communicates with the image forming apparatus 200 via a network card and a network (which are not illustrated), and displays obtained information on a display. Web browser software can operate on the host computer 11. Thus, the host computer 11 can communicate with the image forming apparatus 200 having a Web server function described below, by using a predetermined protocol.

Figure 2:
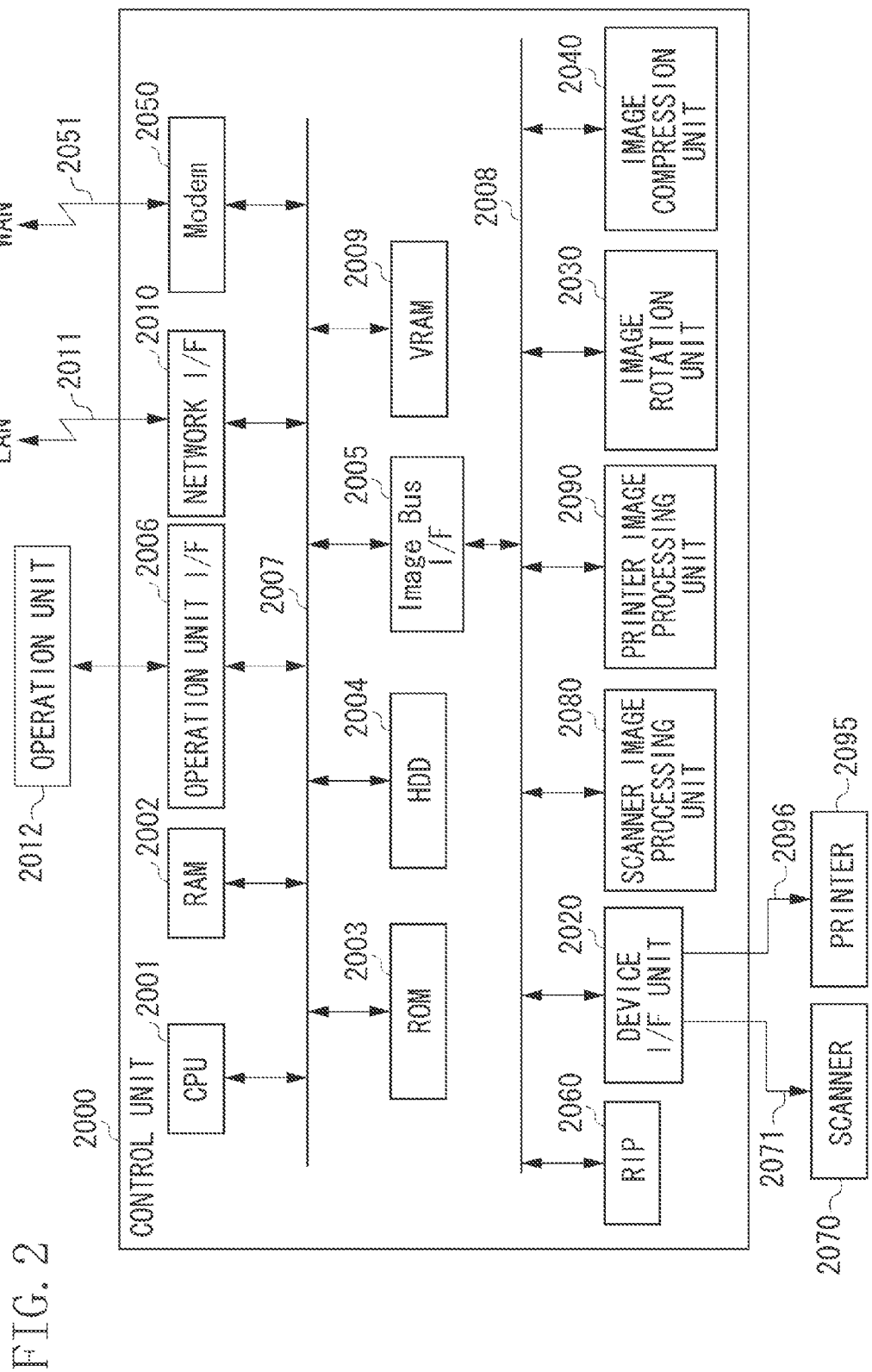
FIG. 2 is a diagram illustrating an example of a configuration of a control unit of an image forming apparatus.

FIG. 2 is a diagram illustrating an example of a configuration of the control unit 2000 of the image forming apparatus 200 illustrated in FIG. 1. In FIG. 2, units that are the same as the units illustrated in FIG. 1 are denoted with the same reference numerals.

The control unit 2000 is connected to the scanner 2070 as the image input device and the printer 2095 as the image output device. The control unit 2000 is further connected to the LAN 2011 and a wide area network (WAN) 2051 to input and output image information and device information to and from an external apparatus.

The CPU 2001 is a controller that controls entirety of the image forming apparatus 200. A RAM 2002 is a work memory on which the CPU 2001 operates, and is also an image memory for temporarily storing image data. A read only memory (ROM) 2003 functions as a boot ROM and stores a boot program of the image forming apparatus 200. A hard disk drive (HDD) 2004 stores a software program, image data, and the like. The CPU 2001 loads a program, stored in the ROM 2003 and the HDD 2004, onto the RAM 2002 and executes the program to implement a software configuration (including an OS) of the image forming apparatus 200 and processing (information processing) in a flowchart described later.

An operation unit I/F 2006 functions as an interface unit for the operation unit 2012, and outputs image data to be displayed on the operation unit 2012 to the operation unit 2012. The operation unit I/F 2006 transfers instruction information, input by a user via the operation unit 2012, to the CPU 2001. A video RAM (VRAM) 2009 is a memory for storing display screen data generated by the CPU 2001. More specifically, the CPU 2001 generates screen information based on display data obtained from the HDD 2004, and stores image data, which is arranged to be displayed on the operation unit 2012, in the VRAM 2009. A network I/F 2010 is connected to the LAN 2011, and inputs and outputs information to and from an external apparatus. A modem 2050 is connected to the WAN 2051 and inputs and outputs information to and from an external apparatus. The devices described above are disposed on a system bus 2007.

An image bus I/F 2005 is a bus bridge that connects between the system bus 2007 and an image bus 2008 and converts a data structure. The image bus 2008 transfers image data at a high speed. The image bus 2008 is formed of a peripheral component interconnect (PCI) bus or an IEEE 1394 bus. The following devices are disposed on the image bus 2008. A raster image processor (RIP) 2060 rasterizes a page description language (PDL) code into a bitmap image. A device I/F unit 2020 connects the CPU 2001 to the scanner 2070 via an image input unit interface 2071 and to the printer 2095 via a printer unit interface 2096. The device I/F unit 2020 performs synchronized/non-synchronized conversion on image data. A scanner image processing unit 2080 corrects, modifies, and edits input image data. A printer image processing unit 2090 executes printer adjustment, resolution conversion, and the like for print output image data. An image rotation unit 2030 executes rotation processing for image data. An image compression unit 2040 executes compression-decompression processing on multi-value image data with JPEG and on binary image data with Joint Bi-level Image Experts Group (JBIG), Modified Modified READ (MMR), or Mail Handler (MH).

Figure 3:
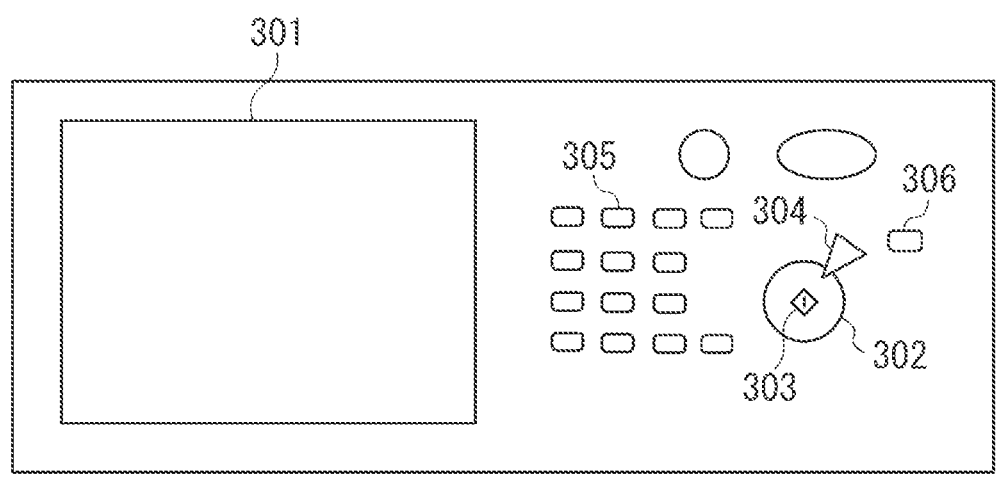
FIG. 3 is a diagram illustrating an example of a device configuration of an operation unit.

FIG. 3 is a diagram illustrating an example of a device configuration of the operation unit 2012. A liquid crystal display unit 301, provided with a touch panel sheet on the liquid crystal display, displays a system operation screen and soft keys, and informs the CPU 2001 of position information of a pressed key of the displayed keys. A start key 302 is pressed by the user when an operation of reading a document image or the other like operation is started. The start key 302 includes light emitting diodes (LED) 303 of two colors that are green and red indicating whether the start key 302 can be used, at a center portion. A stop key 304 is pressed by the user when an operation currently in process in the image forming apparatus 200 is stopped. A numeric keypad 305 includes a group of number and character buttons, and is pressed by the user to set the number of copies and to instruct the liquid crystal display unit 301 to switch the screen. A user mode key 306 is pressed by the user for an apparatus setting.

Figure 4:
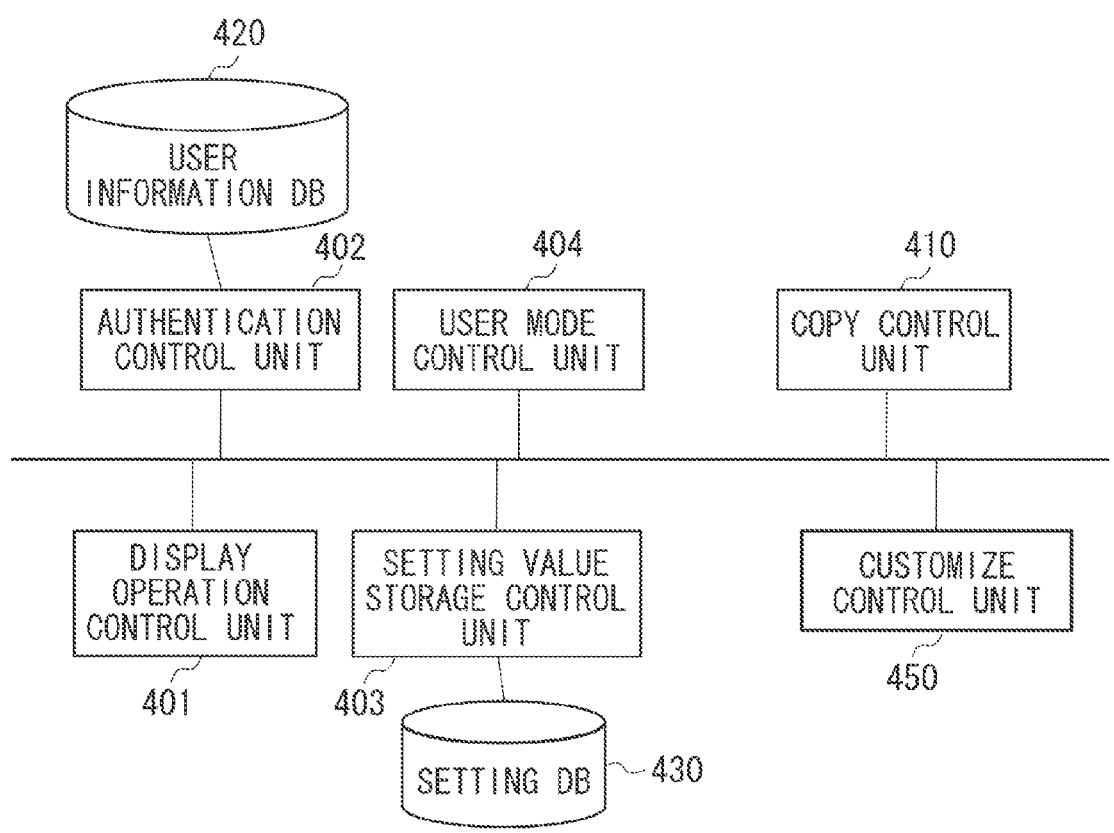
FIG. 4 is a diagram illustrating an example of a software configuration of the image forming apparatus.

FIG. 4 is a diagram illustrating an example of a software configuration of the image forming apparatus 200. A Program corresponding to each of control units illustrated in FIG. 4 are stored in the HDD 2004 and the like, and are loaded onto the RAM 2002 as appropriate to be executed by the CPU 2001 when, for example, the apparatus is started or when a function is used. Thus, the control units illustrated in FIG. 4 are implemented. For example, the image forming apparatus 200 includes the control units, such as a display operation control unit 401, an authentication control unit 402, a setting value storing control unit 403, and a user mode control unit 404 and the like.

The image forming apparatus 200 has at least one or more functions. A control unit is provided for each functions, and as an example of a control unit, a copy control unit 410 is illustrated in FIG. 4. It is a matter of course that a control unit is provided for each function related to processing executed by the image forming apparatus 200 other than those illustrated in FIG. 4. Examples of the other function include a secure print function, a box function, a help function, and a facsimile (FAX) function. With the secure print function, a print job is input from a driver and kept in the image forming apparatus 200, and a user who can print the job is limited to an authenticated user or a user who knows the password associated with the print job. With the box function, image data is stored in the image forming apparatus 200. With the help function, a help screen is displayed. With the FAX function, a FAX document is received from a public communication network.

The display operation control unit 401 controls the operation unit I/F 2006. For example, the display operation control unit 401 executes processing of displaying on the liquid crystal display unit 301 via the operation unit I/F 2006 based on an instruction from another control unit and processing of obtaining instruction information input by the user via the liquid crystal display unit 301. The display operation control unit 401 notifies each control unit as appropriate of the obtained information. The authentication control unit 402 executes authentication processing (hereinafter, referred to as login) for identifying a user, to determine whether a person operating the image forming apparatus 200 is a proper user of the image forming apparatus 200. The authentication control unit 402 controls a database on the HDD 2004 (hereinafter, referred to as user information DB 420). The user information DB 420 stores user information.

Figure 5:
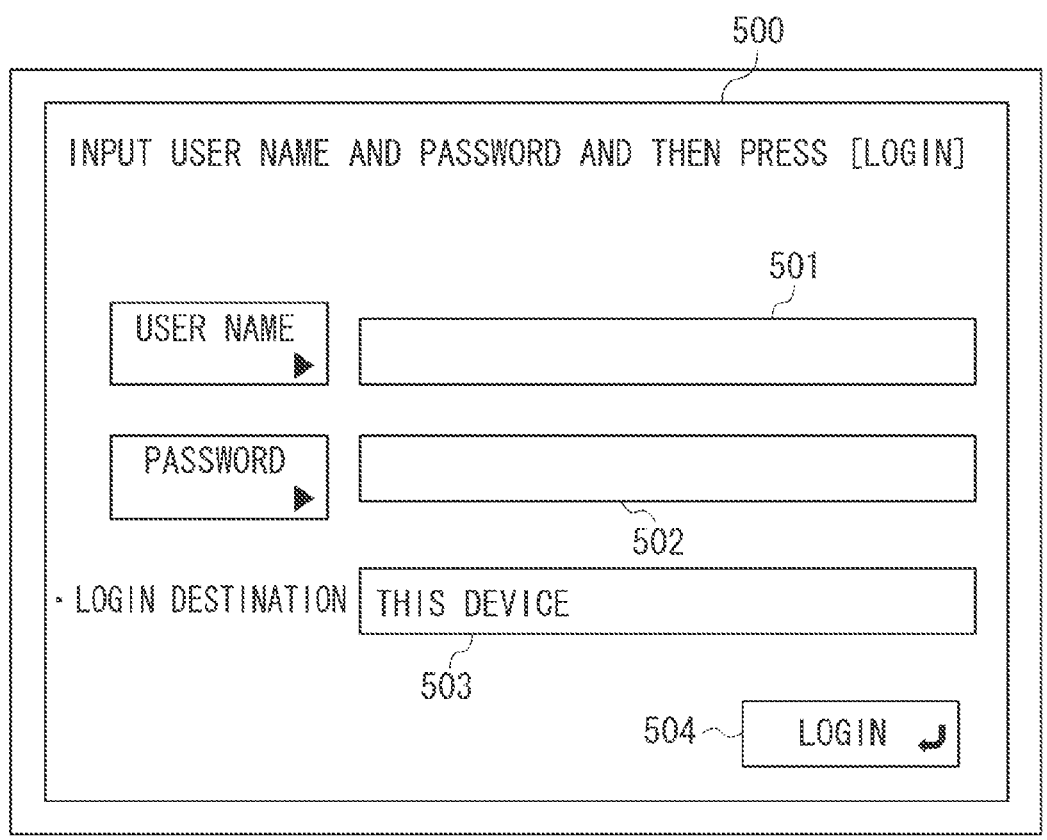
FIG. 5 is a diagram illustrating an example of a login screen.

FIG. 5 is a diagram illustrating an example of a login screen 500 for receiving a request for login processing. In the example illustrated in FIG. 5, the login screen 500 includes a user name input form 501, a password input form 502, a login destination selection button 503, and a login button 504. The user inputs a user name in the user name input form 501 and inputs a password in the password input form 502, in the login screen 500. The user selects the login destination with the login destination selection button 503 and selects (or presses) the login button 504. Thus, the display operation control unit 401 receives the request for login.

Figure 6:
FIG. 6 is a diagram illustrating an example of a message displayed when login fails.

The authentication control unit 402 receives the input user name and password from the display operation control unit 401, and matches the received input user name and password with a user name and a password in the user information DB 420. In a case where the matching has failed, the authentication control unit 402 determines that the login has failed and notifies the user of the login failure via a screen 600 illustrated in FIG. 6. FIG. 6 is a diagram illustrating an example of the screen displaying a message indicating the login failure. On the other hand, in a case where, the matching has succeeded, the authentication control unit 402 determines that the authentication has succeeded. Thus, the authentication control unit 402 changes an authentication state from an un-logged in state to a logged in state, and issues an identifier (hereinafter, referred to as a user identifier) for uniquely identifying the user. The authentication control unit 402 executes personal setting value reflection processing described below, via the setting value storing control unit 403 described below. The personal setting value reflection processing is described in detail in step S1506 in FIG. 14 and the like described below. The authentication control unit 402 notifies the user of the successful login via the display operation control unit 401, and the login processing ends.

An authentication method is not limited to the one described above, and other authentication methods, such as that using a non-contact integrated circuit (IC) card, may be employed. Furthermore, the user information DB 420 may not be provided in the image forming apparatus 200, and a system, such as active directory (AD), where an external authentication server is used for the authentication, may be employed instead, for example. In such a case, the authentication control unit 402 requests the external authentication server to execute the authentication matching, via the network I/F 2010. Furthermore, the image forming apparatus 200 may be capable of switching between the user information DB 420 in the image forming apparatus 200 and the external authentication server. When such a configuration is employed, the user selects which of the user information DB 420 and the external authentication server is used for the authentication, with the login destination selection button 503 in a screen illustrated in FIG. 5, for example.

An operation of changing from the logged in state to the un-logged in state is referred to as logout. The authentication control unit 402 changes the authentication state from the logged in state to the un-logged in state upon receiving a logout instruction from the user via the liquid crystal display unit 301. The authentication control unit 402 performs common setting value reflection processing described below, via the setting value storing control unit 403 described below. The common setting value reflection processing is described in detail in step S1507 in FIG. 14 and the like described below.

The authentication control unit 402 provides user information registering, deleting, and updating functions and the like. The authentication control unit 402 stores the user identifier for uniquely identifying the user in the user information DB 420.

The setting value storing control unit 403 will be described. The setting value storing control unit 403 is a control unit for storing common setting information and personal setting information in a setting DB 430. The common setting information is available to all the users. The personal setting information is available to only the corresponding user. Each piece of setting information includes a combination of at least one or more setting items and a setting value set for each of the setting items. The setting value storing control unit 403 stores each piece of setting information in the setting DB 430 on the HDD 2004. The setting information stored in the setting DB 430 is a combination of a key, which is for identifying a setting item, and a setting value. The setting DB 430 is represented by a hierarchical structure having a first hierarchy including information on a target. The target includes information indicating whether the target is the common setting information or the personal setting information. In a case where the target is the personal setting information, the target further includes information indicating user identifiers 1401a to 1401c illustrated in FIGS. 7A to 7C, each of which is an identifier for identifying a user. In FIGS. 7A to 7D, the information indicating the common setting information is illustrated as "common" and the user identifiers 1401a to 1401c are each illustrated as "user name". The setting value is determined in accordance with the combination of the target and the key. As illustrated in FIGS. 7A to 7C, the personal setting information is set in the setting DB 430 while being associated with user identifier information as illustrated in FIGS. 7A to 7C.

In the example illustrated in FIG. 7A, a setting value is "Japanese" for a combination of a target "user A" and a key "display language". In the example illustrated in FIG. 7B, a setting value is "Chinese" for a combination of a target "user B" and the key "display language". In another example, a setting value is "document type: text, magnification: 50%" for a combination of the target "user B" and a key "default setting for transmission". The image forming apparatus 200 stores personal setting information for each user, and stores only one piece of the common setting information. In an example illustrated in FIG. 7D, the setting value is "English" for a combination of a target "common" and the key "display language".

Some pieces of personal setting information in the setting DB 430 have the same key as the common setting information, while the other pieces do not. A common setting value may be used as an initial value of a non-registered personal setting value, in a case where the personal setting value has the same key as that of the common setting value. According to the example in FIG. 7C, the personal setting value of the key "display language" is not registered for a target "user C". Thus, "English" which is the common setting value is used as the setting value of the display language for the user C.

The setting value storing control unit 403 reads the personal setting value in the setting DB 430 at the time of login, and the personal setting value is reflected on each setting information piece of the image forming apparatus 200. Thus, the user can use the image forming apparatus 200 customized in accordance with the personal setting information registered by the user himself. The setting value storing control unit 403 reads the common setting value in the setting DB 430 at the time of logout, and the common setting value is reflected on each setting information piece of the image forming apparatus 200. Thus, the functions available under the un-logged in state can be used with the common setting value.

The user mode control unit 404 will be described. The user mode control unit 404 has a function (hereinafter, referred to as a "user mode") of registering/changing a setting value of the common setting information and the personal setting information. The user mode control unit 404 displays a setting change screen for changing each of the common setting value and the personal setting value, on the liquid crystal display unit 301. FIGS. 8A to 8E are diagrams each illustrating an example of a user mode screen. The user mode screen displays the settings in a hierarchical structure. When an "environment setting" button 711 on a top hierarchy screen 710 is pressed, an environment setting change screen 720 is displayed. When a "display setting" button 721 is pressed, a display setting change screen 730 is displayed. When a "switch display language/keyboard" button 731 on the display setting change screen 730 is pressed, a display language setting change screen 800 for changing a setting value of the display language is displayed. The user selects a desired language from a language selection list 801 on the display language setting change screen 800, and sets the language thus selected as the setting value of the display language. When a "screen displayed when apparatus has started/recovered" button 732 is pressed in the display setting change screen 730, an initial screen setting change screen 810 for changing a setting value of an initial screen is displayed. The user selects a desired screen from an initial screen selection list 811 on the initial screen setting change screen 810, and sets the screen thus selected as the initial screen.

When the user issues an instruction to change the setting value in each of the setting change screens, the user mode control unit 404 transfers the target setting value to the setting value storing control unit 403. The setting value storing control unit 403 performs reflection of the changed setting value for the setting DB 430. The setting value storing control unit 403 reflects the setting value as the personal setting value, in a case where the authentication control unit 402 determines that the user is in the logged in state. The setting value storing control unit 403 reflects the setting value as the common setting value, in a case where the authentication control unit 402 determines that the user is in the un-logged in state.

Items changeable in the user mode may include an item that can be set only by a user having a special authority. For example, a user having an administrator authority of the image forming apparatus 200 and the like can change both the setting value of the common setting information and the setting value of the personal setting information. A user having a general user authority may be allowed to change only the personal setting value of the user himself. Alternatively, the user having the general user authority may be allowed to change the common setting values of some of the items of the common setting information. Thus, the general user can enjoy improved usability while the demand of the administrator can be satisfied. It is a matter of course that a plurality of special authorities can be set.

Next, the copy control unit 410 will be described. The copy control unit 410 controls a function (hereinafter, referred to as a copy function) of reading, copying, and printing a paper document. The copy control unit 410 reads image data using the scanner 2070, executes image processing on the read image data using the scanner image processing unit 2080, and outputs the resultant image data to the printer 2095.

Figure 9A:
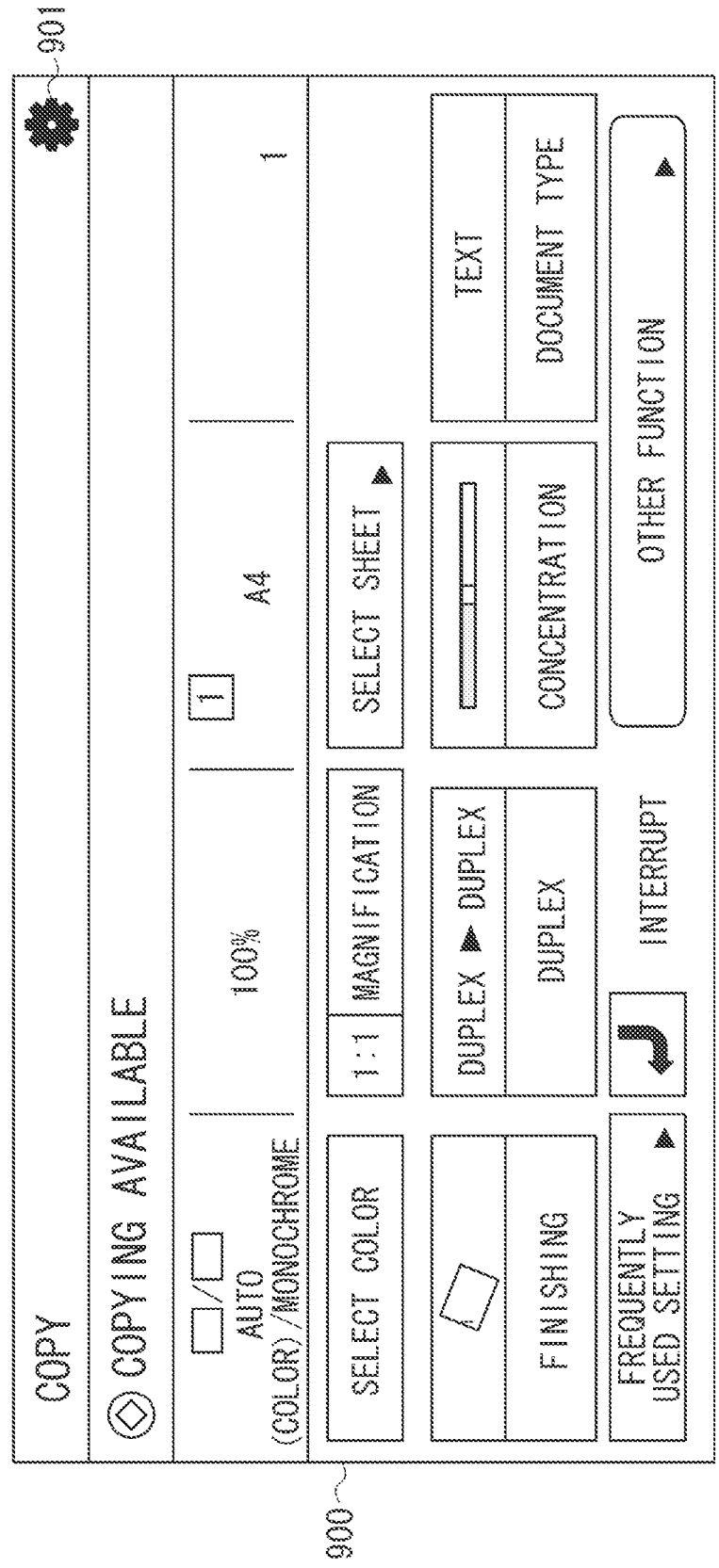
Figure 9B:
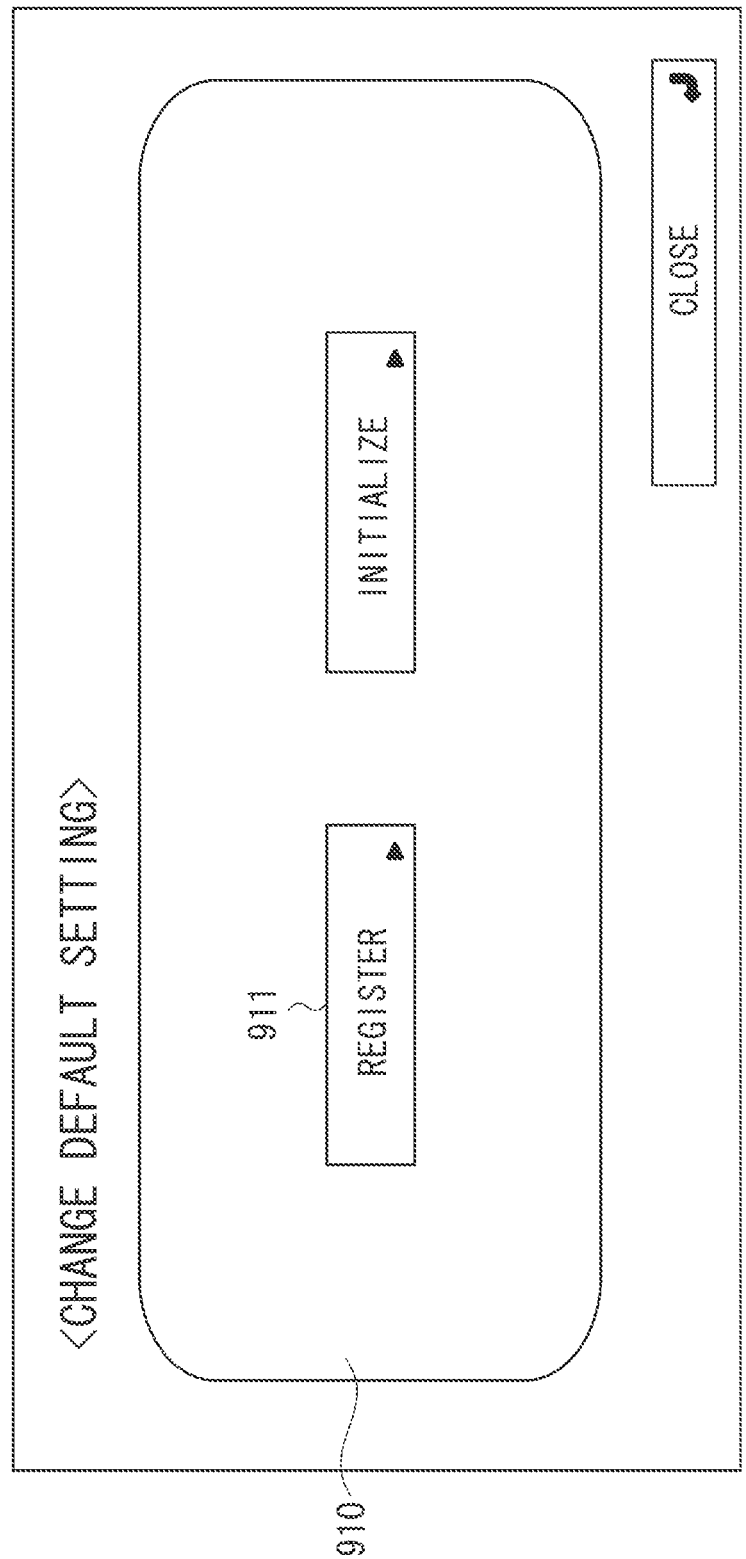

Examples of setting information in the copy function include a layout (N in 1) setting information, duplex-printing setting information, color mode setting information, and the like. The layout (N in 1) setting information is for designating whether a single copy image is generated from N documents. The duplex-printing setting information is for designating whether a single side or both sides of a document are read. The color mode setting information is for designating a printing color, such as full color, monochrome, single color, and the like. The setting items for implementing the copy function are referred to as job setting information. An initial value initially set in a copy job setting screen 900 illustrated in FIG. 9A for setting the job setting information in the copy function is referred to as a default job setting value. When a gear button 901 is pressed in the copy job setting screen 900, the user mode control unit 404 displays a default setting change screen 910. When a "register" button 911 is selected, the user mode control unit 404 displays a setting change confirmation list screen 920, and displays a default job setting value currently set for the copy function in a setting confirmation check list 921. When the user presses a "yes" button 922 in the setting change confirmation list screen 920, the user mode control unit 404 registers the setting value in the setting DB 430. A register instruction issued by the user includes information indicating whether the setting value is registered as the common setting value or the personal setting value.

In a case where the personal setting information is registered in the setting DB 430, the copy control unit 410 reads the default job setting value of the personal setting information, and displays the default job setting value on the copy job setting screen 900. In case where the personal setting information is not registered in the setting DB 430, the copy control unit 410 reads the default job setting value of the common setting information, and displays the default job setting value on the copy job setting screen 900. The user may set the default job setting value not only for the copy function but also for other functions. The copy function also includes a function (hereinafter, referred to as a "call function") for storing a history of the job setting information at the time of when the user executes the copy function, and reading the job setting information stored as a history onto the copy job setting screen 900. The maximum number of a plurality of job setting information pieces, which can be stored with the call function, is three for example. The copy control unit 410 stores the latest history, the second latest history, and the third latest history of the job setting information in the setting DB 430, every time the user executes the copy function. The oldest history is deleted when the number of stored histories exceeds the limit.

FIG. 10 is a diagram illustrating an example of a call screen for calling a history of the job setting information. A call screen 1000 includes a call history designation button 1001 and a job setting confirmation list 1002. The call history designation button 1001 is a button for the user to designate the history of the executed copy function to be called. In the example illustrated in FIG. 10, the latest history, the second latest history, and the third latest history are respectively called by "history 1", "history 2", and "history 3". The job setting confirmation list 1002 displays the detail of the job setting information for each history. In the example illustrated in FIG. 10, the job setting information for "history 1" indicates that the setting value of the duplex information is "from single sided to duplex" and the setting value of the document type information is "text". The copy control unit 410 stores the history of the job setting information as the common setting information available to all the users, and stores the history of the job setting information as the personal setting information available to only the corresponding user, when the user executes the copy function. The copy control unit 410 may store the history of the job setting information as the common setting information and as the personal setting information as well, or may store the history of the job setting information as either one of the common setting information and the personal setting information in accordance with a mode. The image forming apparatus 200 can also store the history of the job setting information for a function other than the copy function. The image forming apparatus 200 may store the history for each function, or store the history as a history common to all the functions.

A customize control unit 450 will be described. The customize control unit 450 controls restriction on changing of a customize target item as the personal setting value. In a case where the item can be set as the personal setting value, the customize control unit 450 performs the personal setting value reflection processing in accordance with the authentication by the authentication control unit 402.

Figure 8A:
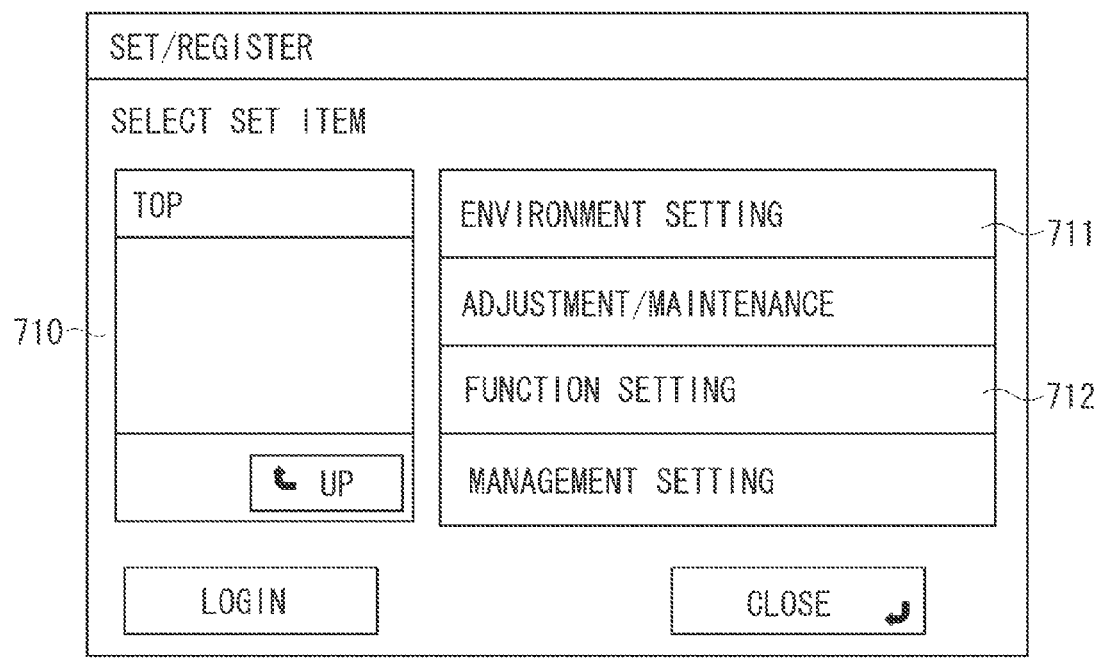
FIGS. 8A, 8B, 8C, 8D, and 8E are diagrams each illustrating an example of a user mode screen.
Figure 8B:
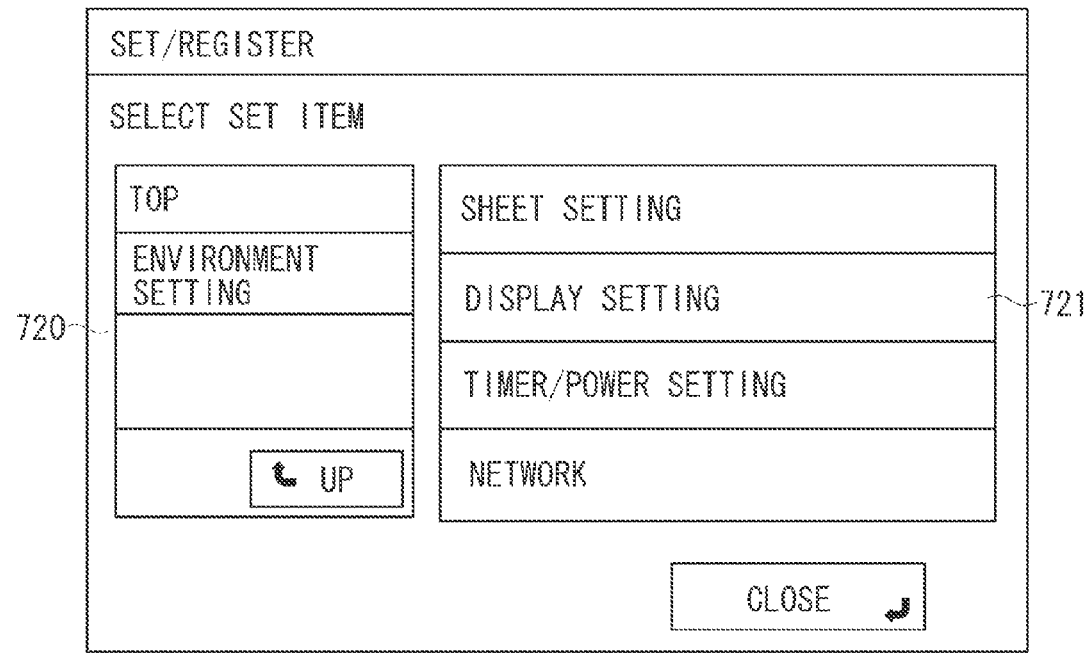
Figure 8C:
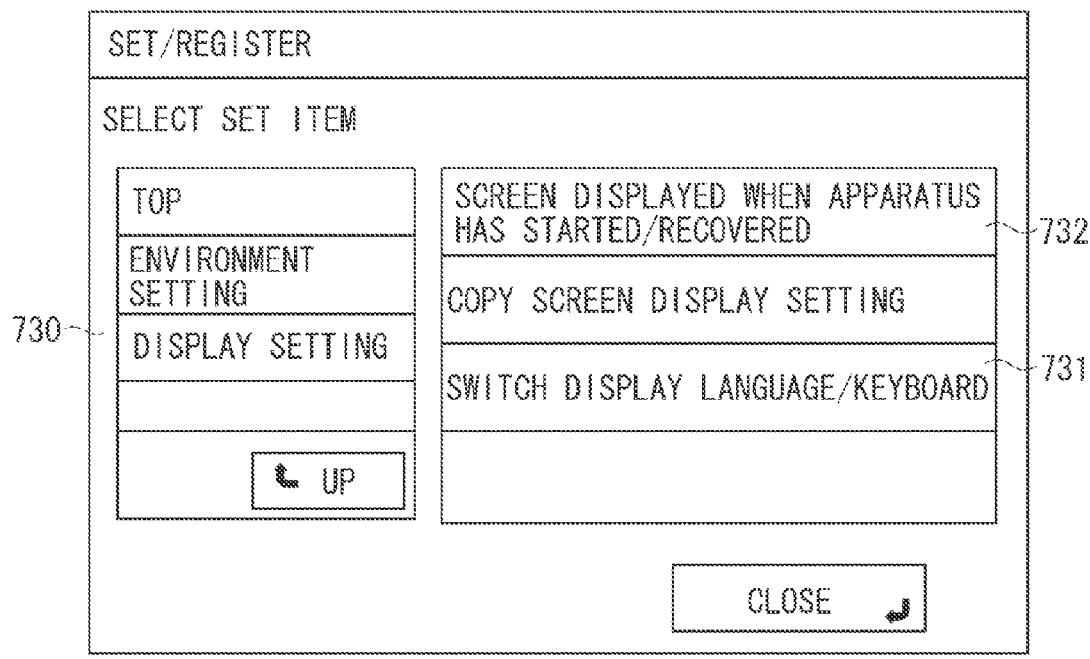
Figure 8D:
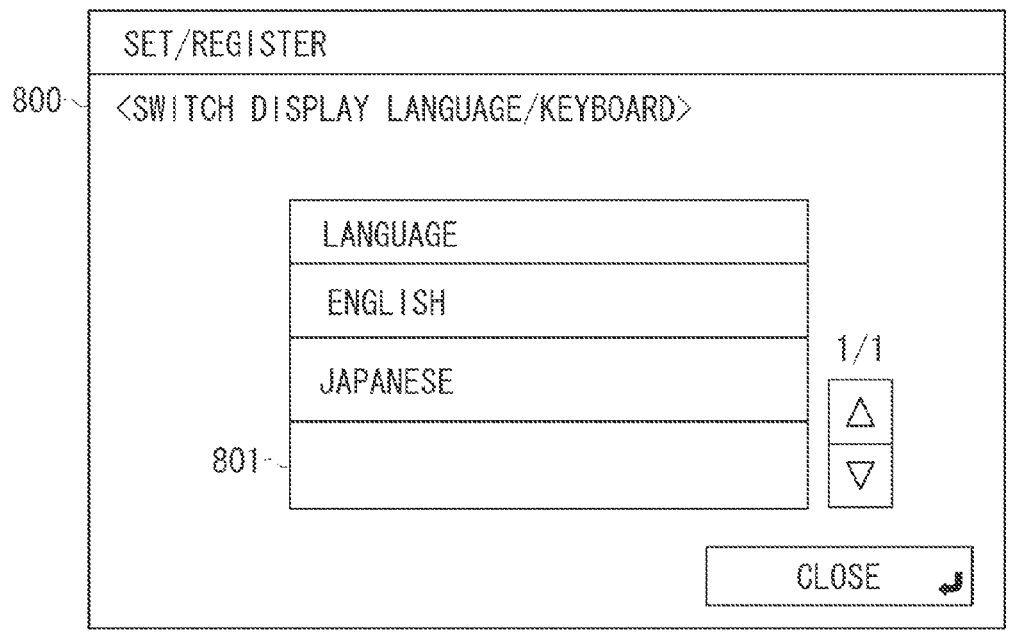
Figure 8E:
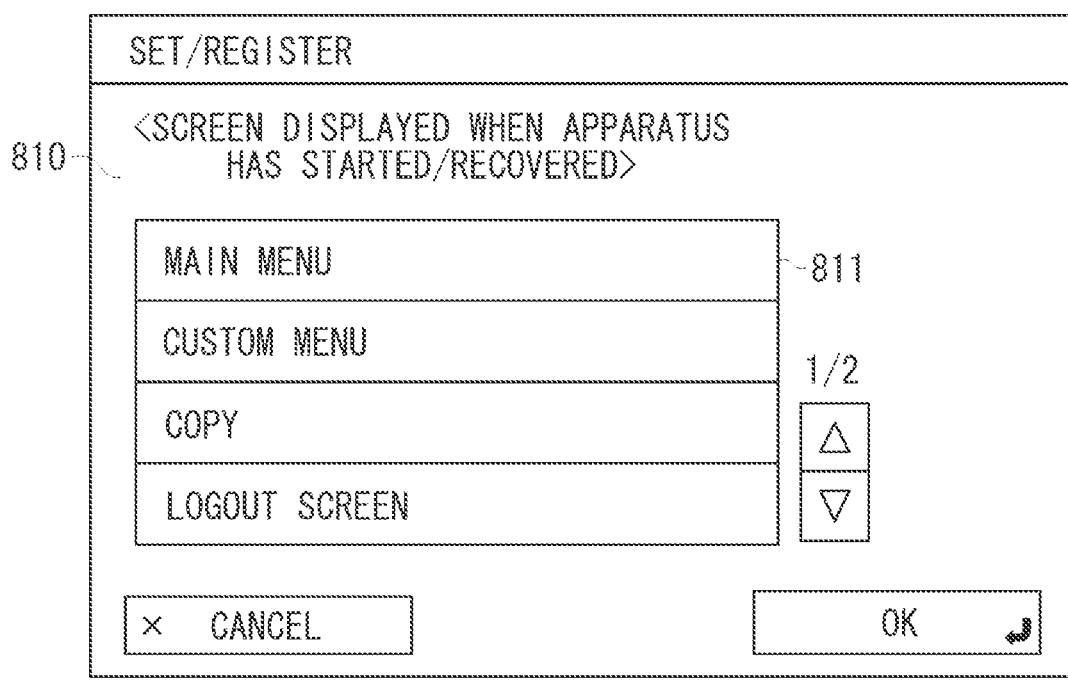
Figure 11A:
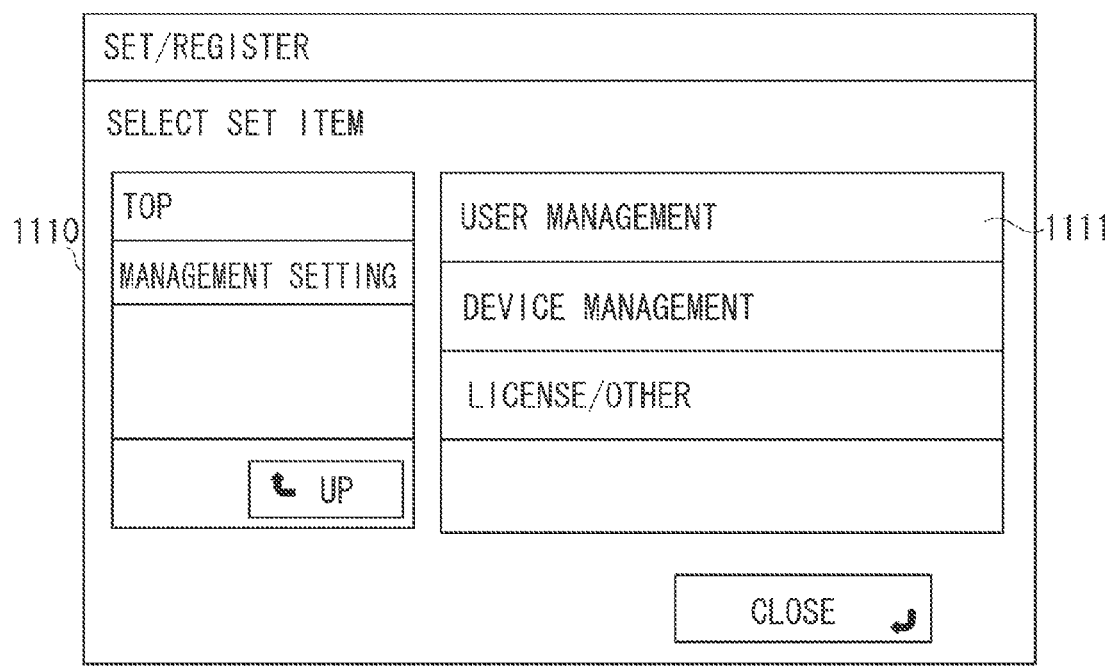
FIGS. 11A, 11B, and 11C are first diagrams each illustrating an example of a customize setting screen.
Figure 11B:
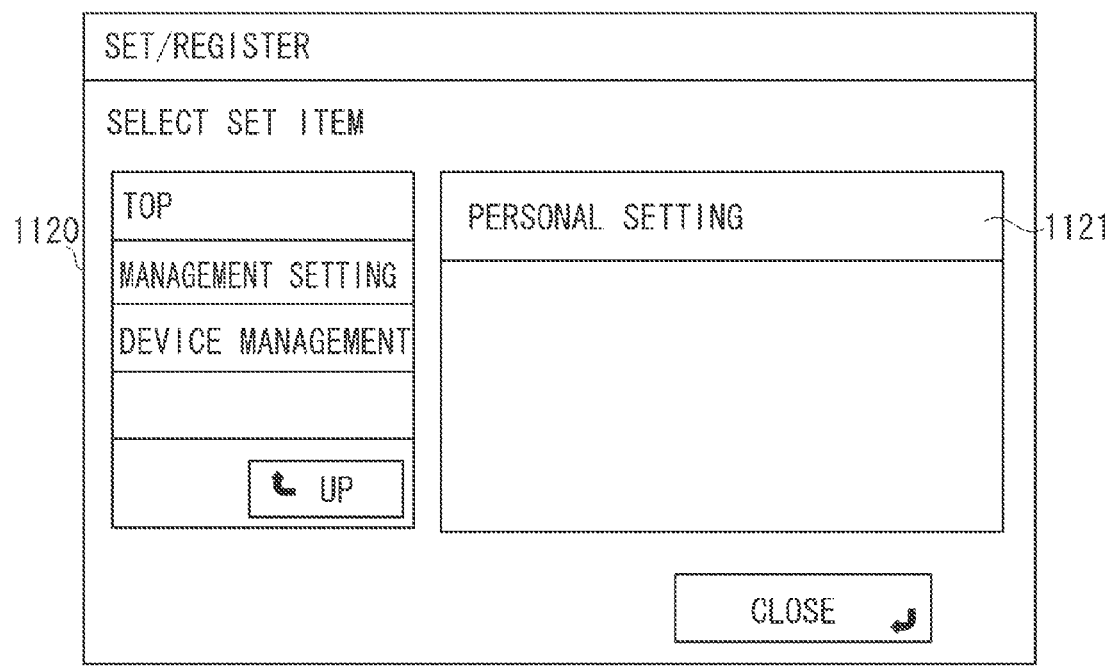
Figure 11C:
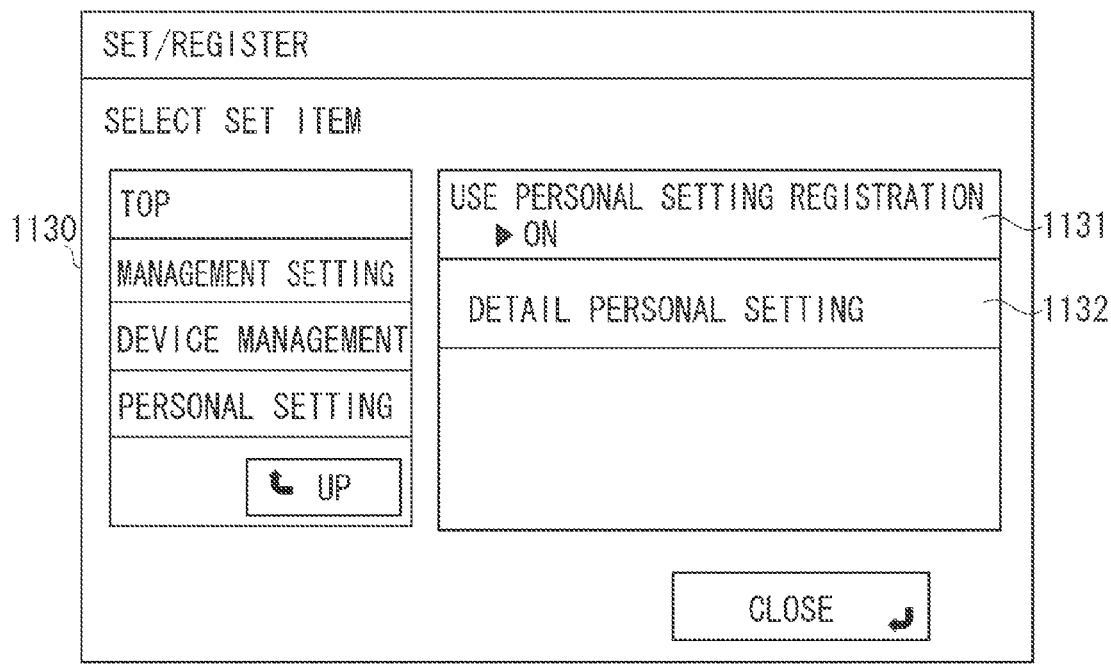
Figure 12:
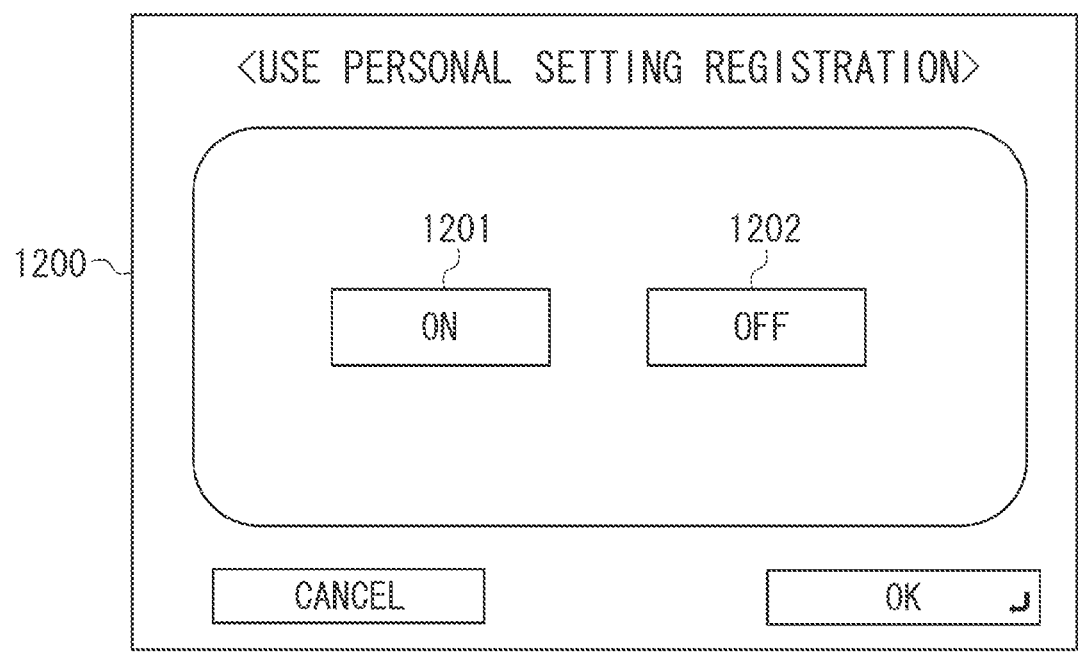
FIG. 12 is a second diagram illustrating an example of a customize setting screen.

Screens for a customize setting is described with reference to FIGS. 11A to 13. When a "management setting" button 712 on the top hierarchy screen 710 for the user mode illustrated in FIG. 8A is pressed, a management setting change screen 1110 illustrated in FIG. 11A is displayed. When a "device management" button 1111 is then pressed, a device management change screen 1120 is displayed. A "personal setting" button 1121 on the device management change screen 1120 can be pressed only by a user who has the administrator authority of the image forming apparatus 200 and successfully authenticated by the authentication control unit 402. In a case where the device management change screen 1120 is displayed by a user not having the administrator authority, the "personal setting" button 1121 is shaded or not displayed, so as not to be selectable. When the "personal setting" button 1121 is pressed, a personal setting change screen 1130 is displayed. When a "use personal setting registration" button 1131 is pressed in the personal setting change screen 1130, a customize setting screen 1200 illustrated in FIG. 12 is displayed. The customize setting screen 1200 is an example of a first setting screen.

The user having the administrator authority can perform a setting for enabling or restricting registration of setting information in the image forming apparatus 200 as the personal setting information. In a case where an ON button 1201 has been selected for registering the personal setting information (registration enabled setting), the customize control unit 450 can register setting information of a customize target item in the image forming apparatus 200 as the personal setting information. On the other hand, in a case where an OFF button 1202 has been selected for not registering the personal setting information (registration restricted setting), the customize control unit 450 can register any setting information in the image forming apparatus 200 as the common setting information.

Figure 13:
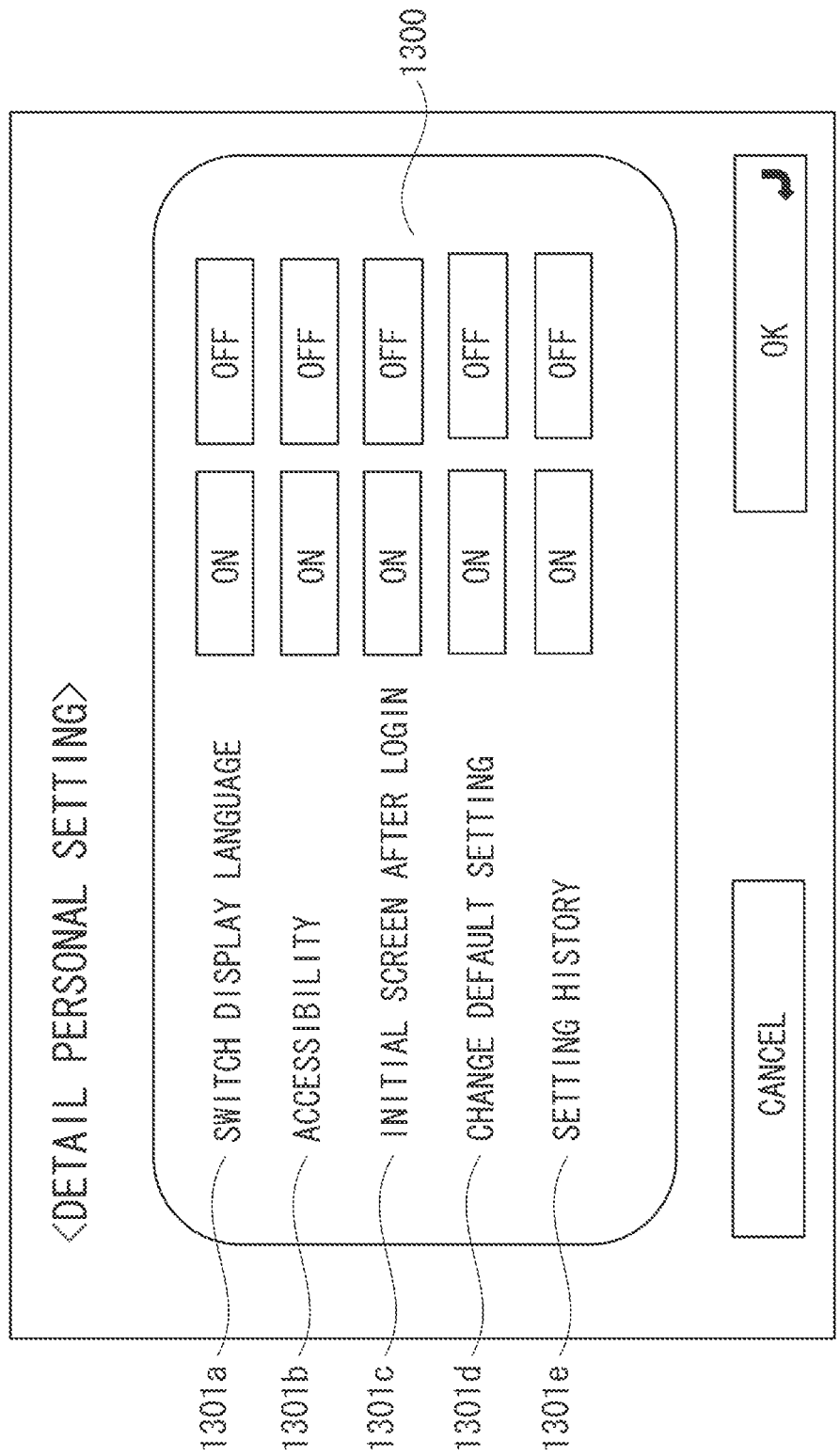
FIG. 13 is a third diagram illustrating an example of a customize setting screen.

FIG. 13 is a diagram illustrating an example of a detail customize setting screen. When a "detail personal setting" button 1132 on the personal setting change screen 1130 illustrated in FIG. 11C is pressed, a detail customize setting screen 1300 illustrated in FIG. 13 is displayed. The detail customize setting screen 1300 is an example of a second setting screen. The "detail personal setting" button 1132 can be selected only in a case where the ON button 1201 has been selected in the customize setting screen 1200. In a case where the OFF button 1202 has been selected in the customize setting screen 1200, the "detail personal setting" button 1132 is shaded or not displayed, so as not to be selectable.

In the detail customize setting screen 1300, whether a personal setting value can be registered can be set for each of the customize target items in the image forming apparatus 200. For each of detail customize setting items 1301a to 1301e, as a customize target in the image forming apparatus 200, an ON button for registering the personal setting value and an OFF button for not registering the personal setting value is selectable.

The item 1301a is for selecting whether a setting value related to a display language in the user mode is registered as the personal setting value. The item 1301b is for selecting whether a screen setting value, related to accessibility, such as audio, a screen color inversion in the user mode, is registered as the personal setting value. The item 1301c is for selecting whether a screen related to an initial screen in the user mode is set by each user. The item 1301d is for selecting whether a default job setting value for a job in each of functions, such as the copy function, the transmission function, and the box function is registered as the personal setting value. The item 1301e is for selecting whether a setting value, read by the call function in each of the functions, such as the copy function and the transmission function, is registered as the personal setting value. The customize target items illustrated in FIG. 13 are merely examples, and items not illustrated in the figure may also be provided.

With the processing described above, the administrator can set whether each of setting items for a customize target can be changed as the personal setting value, and manage the items. Thus, the demand of the administrator can be satisfied without impairing the usability of the general users. Furthermore, whether a setting value can be changed as the personal setting value can be managed independently for items, such as the items 1301a to 1301c related to display, and for the items, such as the items 1301d and 1301e related to the functions. Thus, both the administrator and the general user can enjoy improved usability.

Figure 14:
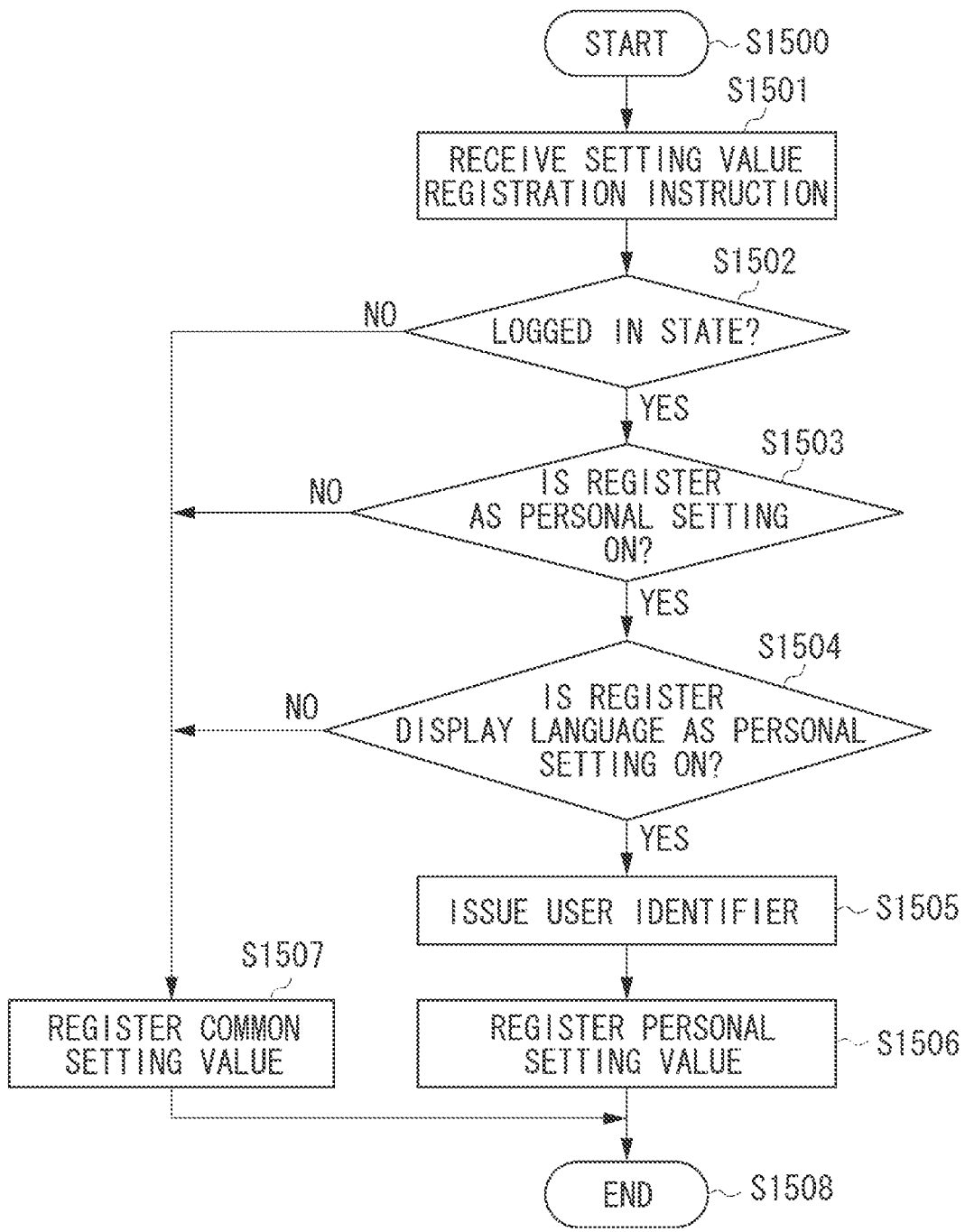
FIG. 14 is a flowchart illustrating an example of display language setting value registration processing.

FIG. 14 is a flowchart illustrating an example of registration processing for a display language setting value, executed by the image forming apparatus 200 according to a first exemplary embodiment. Each processing in the flowchart in FIG. 14 is implemented in such a manner that the CPU 2001 executes a control program stored in the ROM 2003 or the HDD 2004

In step S1500, the display operation control unit 401 starts the processing in a state where the job setting can be received via the liquid crystal display unit 301.

In step S1501, the display operation control unit 401 receives a change (register) instruction for a setting value, related to the display language setting information, from the user. When the user presses the "switch display language/keyboard" button 731 in the display setting change screen 730, the display language setting change screen 800 is displayed. With the operation in which the user selects a desired language in the language selection list 801 in the display language setting change screen 800 and presses an OK button, the display operation control unit 401 receives the change (register) instruction for the setting value.

In step S1502, the authentication control unit 402 determines whether the user is in the logged in state. The authentication method has been described above, and thus will not be described herein. In a case where the authentication control unit 402 determines that the user is in the logged in state, the processing proceeds to step S1503. In a case where the authentication control unit 402 determines that the user is in the un-logged in state, the processing proceeds to step S1507. Thus, the customize restriction can be set in accordance with the authentication state of the user.

In step S1507, the setting value storing control unit 403 stores the setting value of the display language setting information, for which the change instruction has been received in step S1501, in the setting DB 430 as the common setting value (setting value reflection processing). At this point, the display operation control unit 401 may display a message and the like, indicating that the common setting value has been changed, on the operation unit 2012.

In step S1503, the customize control unit 450 determines whether to register the setting information in the image forming apparatus 200 as the personal setting information. In a case where the customize control unit 450 determines that the ON (register personal setting value) button 1201 has been selected in the customize setting screen 1200, the processing proceeds to step S1504. On the other hand, in a case where the customize control unit 450 determines that the OFF (not register personal setting value) button 1202 has been selected in the customize setting screen 1200, the processing proceeds to step S1507. The processing in step S1507 has been described above, and thus will not be described herein.

In step S1504, the customize control unit 450 determines whether to register the display language setting value as the personal setting value. In a case where the customize control unit 450 determines that the customize setting item 1301*a* related to the "display language" is ON (register personal setting value) in the detail customize setting screen 1300, the processing proceeds to step S1505. On the other hand, in a case where the customize control unit 450 determines that the item 1301*a* is OFF (not register personal setting value) in the detail customize setting screen 1300, the processing proceeds to step S1507. The processing in step S1507 has been described above, and thus will not be described herein.

In step S1505, the authentication control unit 402 obtains a user identifier of the user currently in the logged in state from the user information DB 420 and issues the user identifier.

In step S1506, the setting value storing control unit 403 associates the setting value of the display language setting information received in step S1501 with the user identifier issued in step S1505, and stores the resultant setting value in the setting DB 430 as the personal setting value of the display language setting information (setting value reflection processing). At this point, the display operation control unit 401 may display a message and the like, indicating that the personal value has been changed, on the operation unit 2012.

In step S1508, the setting value storing control unit 403 ends the registration processing for the setting value of the display language.

Through the processing described above, the image forming apparatus 200 can switch between registering as the common setting value and registering as the personal setting value for the setting value for which the change instruction has been received. More specifically, the image forming apparatus 200 can switch between registering a setting value as the common setting value and registering the setting value as the personal setting value, in accordance with the authentication state of the user and whether the user is allowed to use the personal setting value.

Figure 15B:
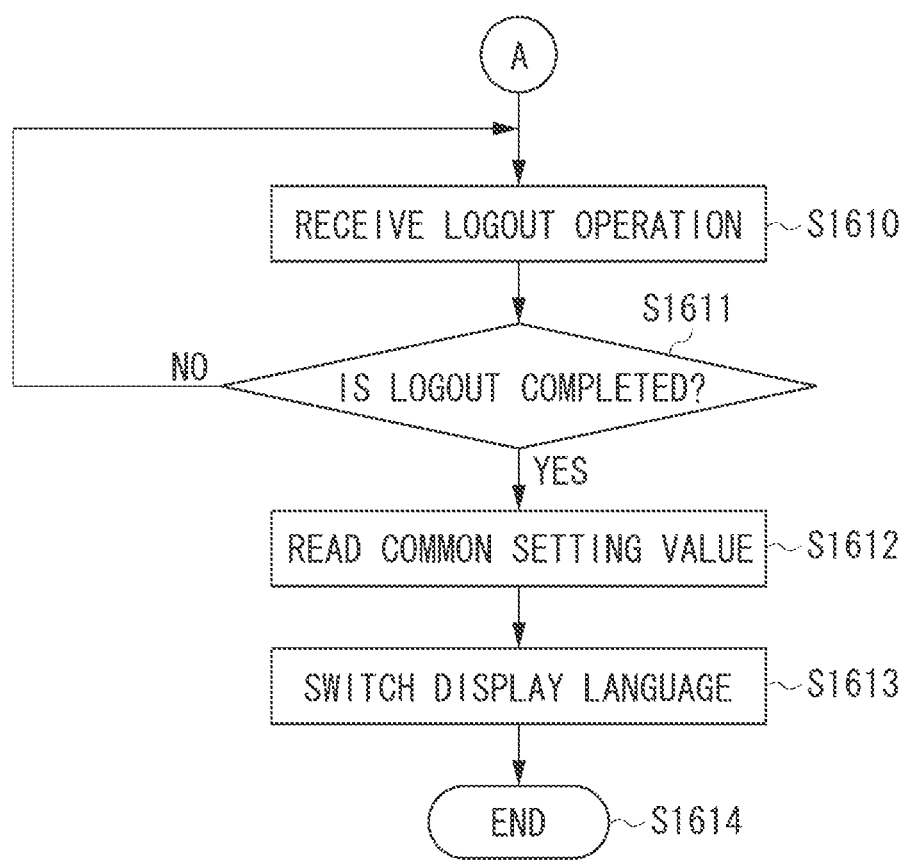

FIG. 15 is a flowchart illustrating an example of display language switching processing, executed by the image forming apparatus 200 according to the present exemplary embodiment. Each processing in the flowchart in FIG. 15 is implemented in such a manner that the CPU 2001 executes a control program stored in the ROM 2003 or the HDD 2004. Here, a case is described where the switching processing is executed in a state where the setting information illustrated in FIGS. 7A to 7D is registered in the setting DB 430.

In step S1600, the display operation control unit 401 starts the processing in a state where an operation can be received via the liquid crystal display unit 301.

In step S1601, the display operation control unit 401 receives a login operation from the user via the login screen 500.

In step S1602, the authentication control unit 402 determines whether the login authentication has succeeded. In a case where the authentication control unit 402 determines that the login authentication has succeeded, the processing proceeds to step S1603. In a case where the authentication control unit 402 determines that the login authentication has failed, the processing returns to step S1601. The authentication method has been described above, and thus will not be described herein.

In step S1603, the customize control unit 450 determines whether the setting value in the image forming apparatus 200 is read as the personal setting value. In a case where the customize control unit 450 determines that the ON (register personal setting value) button 1201 has been selected in the customize setting screen 1200, the processing proceeds to step S1604. On the other hand, in a case where the customize control unit 450 determines that the OFF (not register personal setting value) button 1201 has been selected in the customize setting screen 1200, the processing proceeds to step S1608.

In step S1604, the customize control unit 450 determines whether the display language setting value is read as the personal setting value. In a case where the customize control unit 450 determines that the customize setting item 1301*a* for "display language" is ON (register personal setting value) in the detail customize setting screen 1300, the processing proceeds to step S1605. On the other hand, in a case where the customize control unit 450 determines that the item 1301*a* is OFF (not register personal setting value), the processing proceeds to step S1608.

In step S1605, the authentication control unit 402 obtains the user identifier of the user currently in the logged in state from the user information DB 420 and issues the user identifier.

In step S1606, the setting value storing control unit 403 determines whether there is a personal setting value registered with the key "display language" in the setting DB 430, by targeting the user name of the user identifier issued in step S1605. In a case where the setting value storing control unit 403 determines that such a personal setting value exists, the processing proceeds to step S1607. In step S1607, the setting value storing control unit 403 obtains the personal setting value from the setting DB 430. On the other hand, in a case where the setting value storing control unit 403 determines that such a personal setting value does not exist, the processing proceeds to step S1608. In step S1608, the setting value storing control unit 403 obtains the common setting value from the setting DB 430. According to the example illustrated in FIGS. 7A and 7D, in a case where the target is the "user B", the personal setting value "Chinese" corresponding to the key "display language" exists. Thus, the setting value storing control unit 403 obtains a setting value of "display language—Chinese" in step S1607. On the other hand, in a case where the target is the "user C", no personal setting value corresponding to the key "display language" is registered. Thus, in step S1608, the setting value storing control unit 403 obtains a setting value of "display language—English" which is the setting value of the common setting value. The setting value storing control unit 403 obtains the common setting value from the setting DB 430 also in a case where the processing in step S1608 is executed after the processing in step S1603 or S1604.

In step S1609, the customize control unit 450 reflects the setting value of the display language setting information obtained in step S1607 or S1608 on the operation unit 2012, whereby the display language switching processing is executed.

In step S1610, the display operation control unit 401 receives the logout instruction via the operation unit 2012. The display operation control unit 401 receives the logout instruction when the user in the logged in state presses a logout button displayed on the operation unit 2012. The display operation control unit 401 may determine that the logout instruction is received in a case where no operation is performed for a predetermined time period in the logged in state, so that a predetermined time period times out.

In step S1611, the display operation control unit 401 determines whether the logout has been completed. In a case where the display operation control unit 401 determines that the logout has been completed, the processing proceeds to step S1612. In a case where the display operation control unit 401 determines that the logout has not been completed, the processing returns to step S1610 and the processing is repeated until the logout is completed.

In a case where the user has completed the logout and thus is in the un-logged in state, in steps S1612 and S1613, processing of resetting the display language setting value to the common setting value is executed. According to the example illustrated in FIGS. 7A to 7D, in step S1612, the setting value storing control unit 403 obtains a setting value "English", which is the common setting value, corresponding to the key "display language" of the target "common" from the setting DB 430.

In step S1613, the customize control unit 450 reflects the common setting value, obtained in step S1612, on the operation unit 2012, whereby the display language switching processing is executed. In a case where the setting value changed by the user in the processing illustrated in FIG. 14 described above is registered as the common setting value, the changed common setting value is read in step S1608 in FIG. 15. Then, in step S1609, the display language is switched to that indicated by the changed common setting value read in step S1608. In this case, the user may reset the changed common setting value to the common setting value before the change, after the logout is completed. Thus, the common setting value before the change is read in step S1612, whereby the customize control unit 450 can reset the display language to that indicated by the common setting value before the change, in step S1613. In a case where a configuration where a change history of the common setting information is stored in the setting DB 430 is employed, the customize control unit 450 may automatically reset the display language to that before the change based on the change history.

In step S1614, the customize control unit 450 ends the display language switching processing.

Through the processing described above, the image forming apparatus 200 can switch between reflecting the common setting value and reflecting the personal setting value to a setting value of a setting item. More specifically, the image forming apparatus 200 can switch between reflecting the common setting value and reflecting the personal setting value, in accordance with the user authentication and whether the user is allowed to use the personal setting value.

As described above, according to the present exemplary embodiment, the image forming apparatus 200 can switch between changing the common setting value and changing the personal setting value, in accordance with whether the user is allowed to use the personal setting value. Thus, in a case where a user cannot change the personal setting value, the user can use the image forming apparatus 200 by changing the common setting value. All things considered, the image forming apparatus 200 can prevent the setting value to be changed by the general user in a way unwanted by the administrator and the like, without impairing the usability of the general user.

According to the first exemplary embodiment, all the users change any one of the personal setting value or the common setting value, with the processing of changing the display language setting value as an example. In a second exemplary embodiment, a method for allowing only some of the users to change the common setting value in a case where the personal setting value cannot be changed is described with the processing of changing the setting of the initial screen after login (hereinafter, referred to as an initial screen) as an example. For example, the administrator would like to set the "management screen" as the initial screen to manage usage records of the apparatus. Thus, the administrator might not like to enable the general user to change the setting of the initial screen. The processing executed by the image forming apparatus 200 in such a case is described below.

Figure 16:
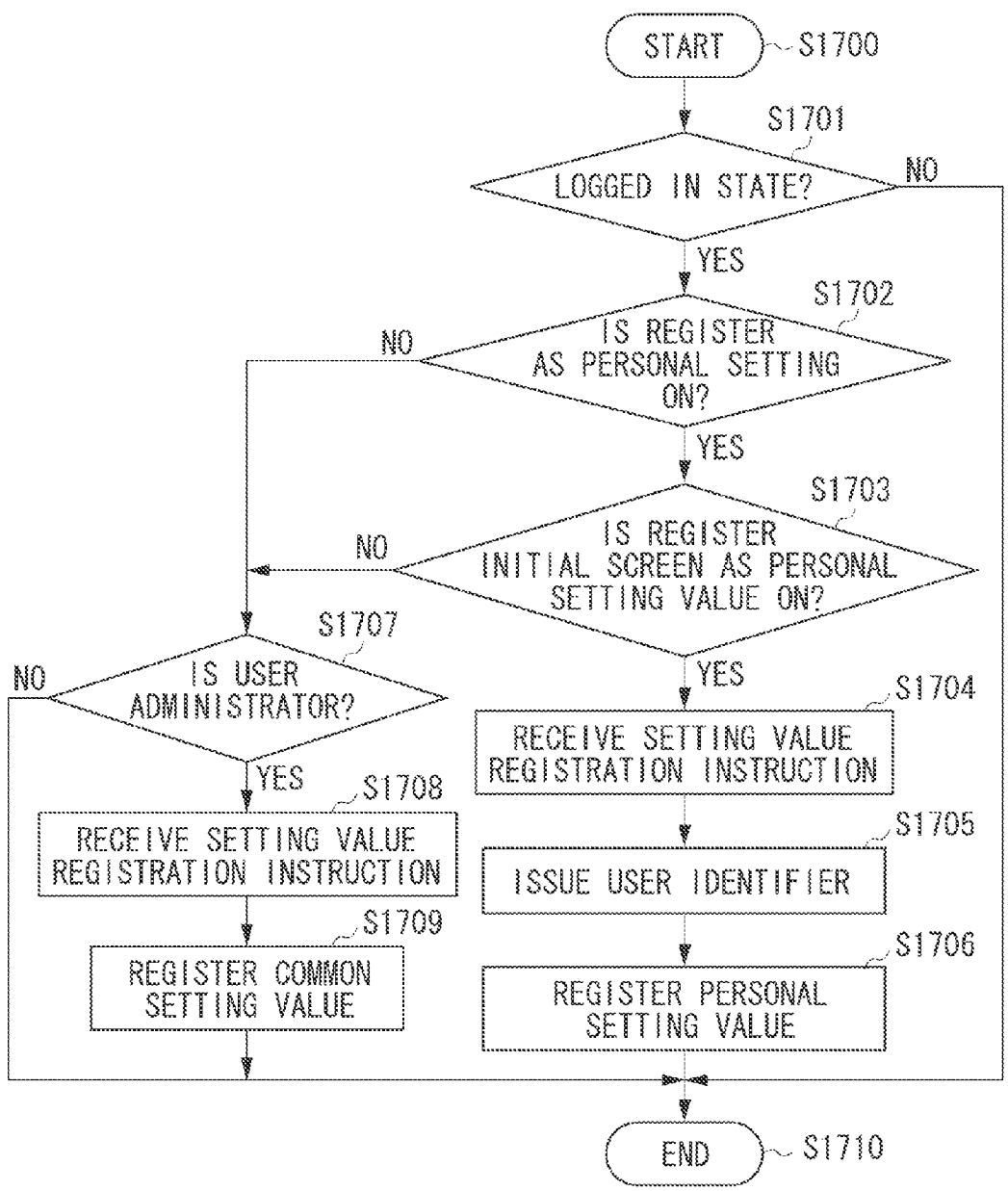
FIG. 16 is a flowchart illustrating an example of initial screen setting value registration processing.

FIG. 16 is a flowchart illustrating an example of registration processing for the setting value of the initial screen setting information, executed by the image forming apparatus 200 according to the present exemplary embodiment. Each processing in the flowchart in FIG. 16 is executed in such a manner that the CPU 2001 of the image forming apparatus 200 executes a control program stored in the ROM 2003 or the HDD 2004.

In step S1700, the display operation control unit 401 starts the processing in a state where a job setting can be received via the liquid crystal display unit 301.

In step S1701, the authentication control unit 402 determines whether the user is in the logged in state. The authentication method has been described above, and thus will not be described herein. In a case where the authentication control unit 402 determines that the user is in the logged in state, the processing proceeds to step S1702. On the other hand, in a case where the authentication control unit 402 determines that the user is in the un-logged in state, the "screen displayed when apparatus has started/recovered" button 732 is shaded by the user mode control unit 404 so as not to be selectable by the user, and the processing proceeds to S1710 where the processing in FIG. 16 ends, without executing the processing of changing the setting of the initial screen.

The processing in step S1702 is the same as the processing in step S1503 and thus will not be described.

In step S1703, the customize control unit 450 determines whether the initial screen setting value is registered as the personal setting value. In a case where the customize control unit 450 determines that the item 1301c of the customize setting in the "initial screen after login" is ON (register personal setting value) in the detail customize setting screen 1300, the processing proceeds to step S1704. On the other hand, in a case where the customize control unit 450 determines that the item 1301c is OFF (not register personal setting value), the processing proceeds to step S1707.

In step S1704, the display operation control unit 401 receives the change instruction (register instruction) for the setting value related to the initial screen setting information from the user. When the user presses the "screen displayed when apparatus has started/recovered" button 732 on the display setting change screen 730, the initial screen setting change screen 810 is displayed. The user selects a desired initial screen in the initial screen selection list 811 in the initial screen setting change screen 810 and presses the OK button, whereby the display operation control unit 401 receives the change instruction (register instruction) for the setting value.

The processing in step S1705 is the same as the processing in step S1505, and thus will not be described.

In step S1706, the setting value storing control unit 403 associates the setting value of the initial screen setting information received in step S1704 with the user identifier issued in step S1705, and stores the resultant setting value in the setting DB 430 as the personal setting value of the initial screen setting information (setting value reflection processing). At this point, the display operation control unit 401 may display a message, indicating that the personal setting value has been changed, on the operation unit 2012.

In step S1707, the authentication control unit 402 determines whether the user has the administrator authority. In a case where the authentication control unit 402 determines that the user has the administrator authority, the processing proceeds to step S1708. On the other hand, in a case where the authentication control unit 402 determines that the user does not have the administrator authority, the "screen displayed when apparatus has started/recovered" button 732 is shaded by the authentication control unit 402 so as not to be selectable by the user, and the processing proceeds to step S1710 where the processing in FIG. 16 ends, without executing the setting change processing for the initial screen. Thus, the customize restriction can be set in accordance with an authority of a user. The administrator authority is an example of a predetermined user authority.

The processing in step S1708 is the same as the processing in step S1704, and thus will not be described.

In step S1709, the setting value storing control unit 403 stores the setting value of the initial screen setting information, for which the change instruction has been received in step S1708, in the setting DB 430 as the common setting value (setting value reflection processing). At this point, the display operation control unit 401 may display a message and the like, indicating that the common setting value has been changed, on the operation unit 2012.

In step S1710, the setting value storing control unit 403 ends the registration processing for the setting value of the initial screen setting information.

Through the processing described above, the image forming apparatus 200 can switch between registering as the common setting value and registering as the personal setting value for the setting value for which the change instruction has been received. More specifically, the image forming apparatus 200 can switch between registering as the common setting value and registering as the personal setting value, in accordance with the authority of the user and whether the user is allowed to use the personal setting value.

Figure 17B:
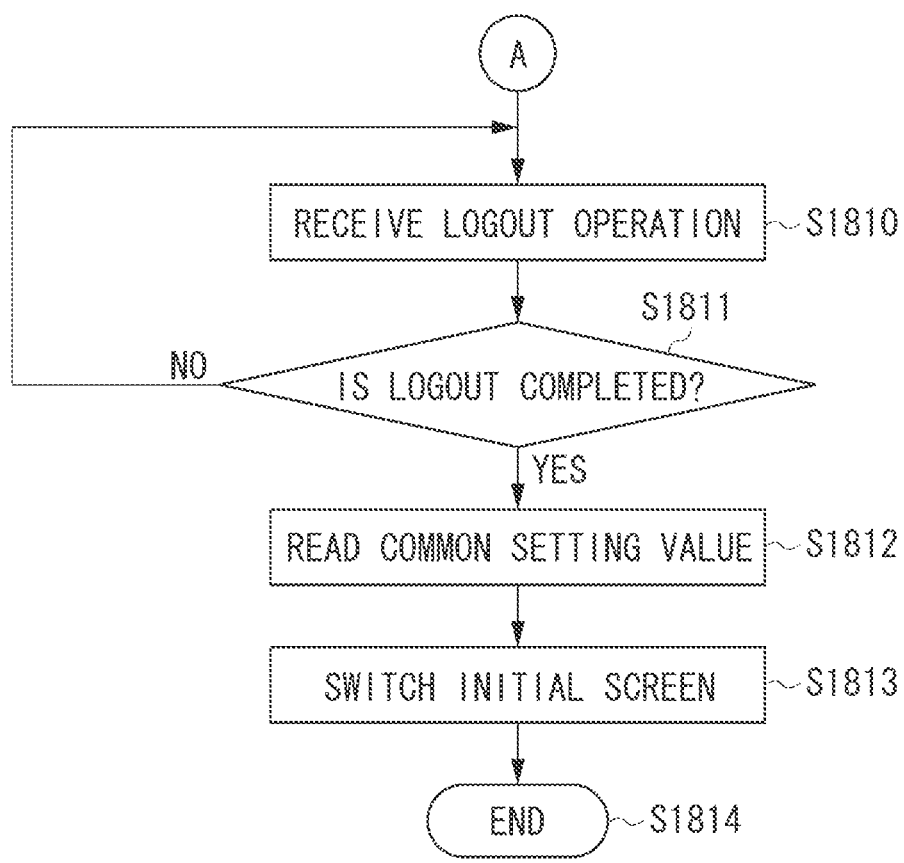

FIG. 17 is a flowchart illustrating an example of initial screen switching processing, executed by the image forming apparatus 200 according to the present exemplary embodiment. Each processing illustrated in the flowchart in FIG. 17 is implemented in such a manner that the CPU 2001 of the image forming apparatus 200 executes a control program stored in the ROM 2003 or the HDD 2004. Here, a case is described where the switching processing is executed in a state where the setting information illustrated in FIGS. 7A to 7D is registered in the setting DB 430.

The processing from step S1800 to step S1803 is the same as the processing from step S1600 to step S1603, and thus will not be described.

In step S1804, the customize control unit 450 determines whether the setting value of the "initial screen" is read as the personal setting value. In a case where the customize control unit 450 determines that the item 1301c of the customize setting in the "initial screen after login" is ON (register personal setting value) in the detail customize setting screen 1300, the processing proceeds to step S1805. On the other hand, in a case where the customize control unit 450 determines that the item 1301c is OFF (not registered personal setting value), the processing proceeds to step S1808.

The processing in step S1805 is the same as the processing in step S1605, and thus will not be described.

In step S1806, the setting value storing control unit 403 determines whether there is a personal setting value registered with the key "initial screen" in the setting DB 430, by targeting the user name of the user identifier issued in step S1805. In a case where the setting value storing control unit 403 determines that such a personal setting value exists, the processing proceeds to step S1807. In step S1807, the setting value storing control unit 403 obtains the personal setting value from the setting DB 430. On the other hand, in a case where the setting value storing control unit 403 determines that such a personal setting value does not exist, the processing proceeds to step S1808. In step S1808, the setting value storing control unit 403 obtains the common setting value from the setting DB 430. According to the example in FIGS. 7A to 7D, in a case where the target is the "user A", a personal setting value "top menu" corresponding to a key "initial screen" exists. Thus, the setting value storing control unit 403 obtains a setting value of "initial screen—top menu" in step S1807. On the other hand, in a case where the target is the "user B", no personal setting value corresponding to the key "initial screen" is registered. Thus, in step S1808, the setting value storing control unit 403 obtains a setting value "initial screen—copy" which is the setting value of the common setting value. The storing control unit 403 obtains the common setting value from the setting DB 430 also in a case where the processing in step S1808 is executed after the processing in step S1803 or S1804.

In step S1809, the customize control unit 450 reflects the setting value of the initial screen setting information obtained in step S1807 or S1808 on the operation unit 2012, whereby the initial screen switching processing is executed.

Processing in steps S1810 and S1811 is the same as the processing in steps S1610 and S1611, and thus will not be described.

In a case where the user has completed the logout and thus is in the un-logged in state, in steps S1812 and S1813, the processing of resetting the setting value of the initial screen to the common setting value is executed. According to the example illustrated in FIGS. 7A to 7D, in step S1812, the setting value storing control unit 403 obtains a setting value "copy", which is the common setting value, corresponding to the key "initial screen" of the target "common" from the setting DB 430. In step S1813, the customize control unit 450 reflects the common setting value obtained in step S1812 on the operation unit 2012, whereby the initial screen switching processing is executed.

In step S1814, the customize control unit 450 ends the initial screen switching processing.

Through the processing described above, the image forming apparatus 200 can switch between reflecting the common setting value and reflecting the personal setting value to the setting value of the setting item. More specifically, the image forming apparatus 200 can switch between reflecting the common setting value and reflecting the personal setting value, in accordance with the authority of the user and whether the user is allowed to use the personal setting value.

According to the present exemplary embodiment described above, the image forming apparatus 200 can switch between changing the common setting value and changing the personal setting value, in accordance with the authority of the user and whether the user is allowed to use the personal setting value. All things considered, the customize restriction can be set more in detail by taking the authority of the user into consideration, whereby both the administrator and the general user can enjoy improved usability.

According to the first and the second exemplary embodiments, the personal setting value or the common setting value is changed for the setting items in the user mode. According to a third exemplary embodiment, the personal setting value and the common setting value are changed for a job setting in each function. Here, an example where a default job setting value is changed in the copy function is described.

Figure 18:
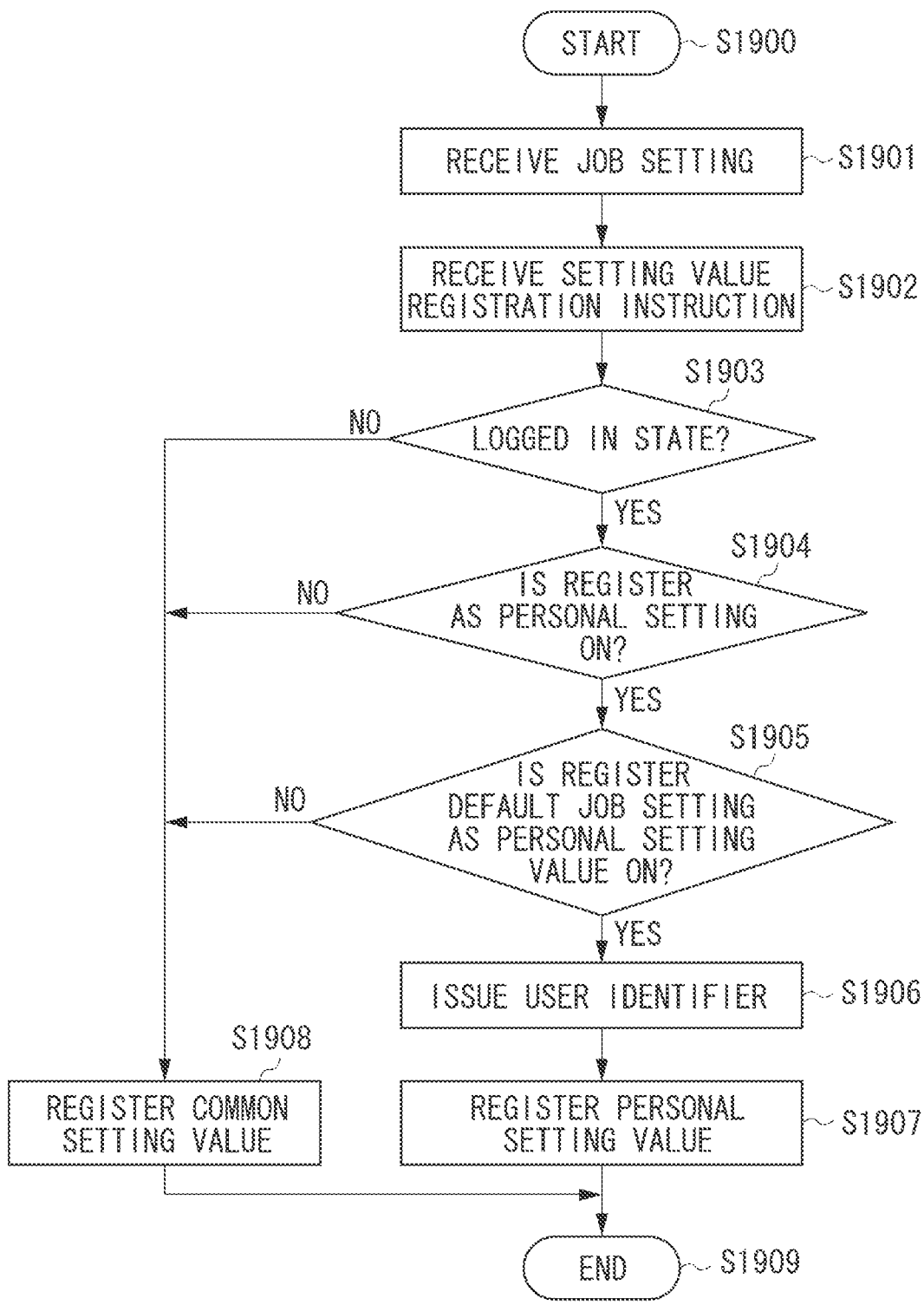
FIG. 18 is a flowchart illustrating an example of default job setting value registration processing.

FIG. 18 is a flowchart illustrating an example of registration processing for a default job setting value in the copy function, executed by the image forming apparatus 200 according to the present exemplary embodiment. Each processing in the flowchart in FIG. 18 is implemented in such a manner that the CPU 2001 of the image forming apparatus 200 executes a control program stored in the ROM 2003 or the HDD 2004.

In step S1900, the display operation control unit 401 starts the processing in the state where a job setting can be received via the liquid crystal display unit 301.

In step S1901, the display operation control unit 401 receives a certain job setting operation from the user, via the copy job setting screen 900 displayed in the liquid crystal display unit 301 on the operation unit 2012. For example, it is assumed that the user inputs a setting "from single-sided to duplex" for the item "duplex" and a setting "text" for the item "document type".

In step S1902, the display operation control unit 401 receives an instruction for registration processing for the setting value related to the default job setting information, from the user. When the user presses the gear button 901 in the copy job setting screen 900, the default setting change screen 910 is displayed. When the user presses the "register" button 911, the setting change check list screen 920 is displayed. In the setting change check list 921, the default job setting values in the copy function set by the user are listed. The user presses the "yes" button 922 in the screen, whereby the display operation control unit 401 receives the instruction for the registration processing for the default job setting value in the copy function.

The processing in step S1903 is the same as the processing in step S1502, and thus will not be described.

In step S1908, the setting value storing control unit 403 stores the default job setting value of the default job setting information, for which the register instruction is received in step S1902, in the setting DB 430 as the common setting value (setting value reflection processing). At this point, the display operation control unit 401 may display a message and the like, indicating that the common setting value has been changed, on the operation unit 2012.

The processing in step S1904 is the same as the processing step S1503, and thus will not be described.

In step S1905, the customize control unit 450 determines whether the default job setting value is registered as the personal setting value. In a case where the customize control unit 450 determines that the item 1301d of the customize setting for the "change default setting" is ON (register personal setting value) in the detail customize setting screen 1300, the processing proceeds to step S1906. On the other hand, in a case where the customize control unit 450 determines that the item 1301d is OFF (not register personal setting value) in the detail customize setting screen 1300, the processing proceeds to step S1908. The processing in step S1908 has been described above, and thus will not be described herein.

The processing in step S1906 is the same as the processing in step S1505, and thus will not be described.

In step S1907, the setting value storing control unit 403 associates the setting value of the default job setting information in the copy function received in step S1902 with the user identifier issued in step S1906, and stores the resultant setting value in the setting DB 430 as the personal setting value of the default job setting information (setting value reflection processing). At this point, the display operation control unit 401 may display a message and the like, indicating that the personal setting value has been changed, on the operation unit 2012.

In step S1909, the setting value storing control unit 403 ends the registration processing for the default job setting value in the copy function.

Through the processing described above, the image forming apparatus 200 can switch between registering as the common setting value and registering as the personal setting value for the setting value, for which the change instruction has been received, in accordance with the login state of the user and whether the user is allowed to use the personal setting value. The image forming apparatus 200 can independently set customize restriction for the items related to the display on the operation unit 2012, such as the display language, the accessibility, and the initial screen, and for the items related to the job setting, such as the default setting.

Figure 19B:
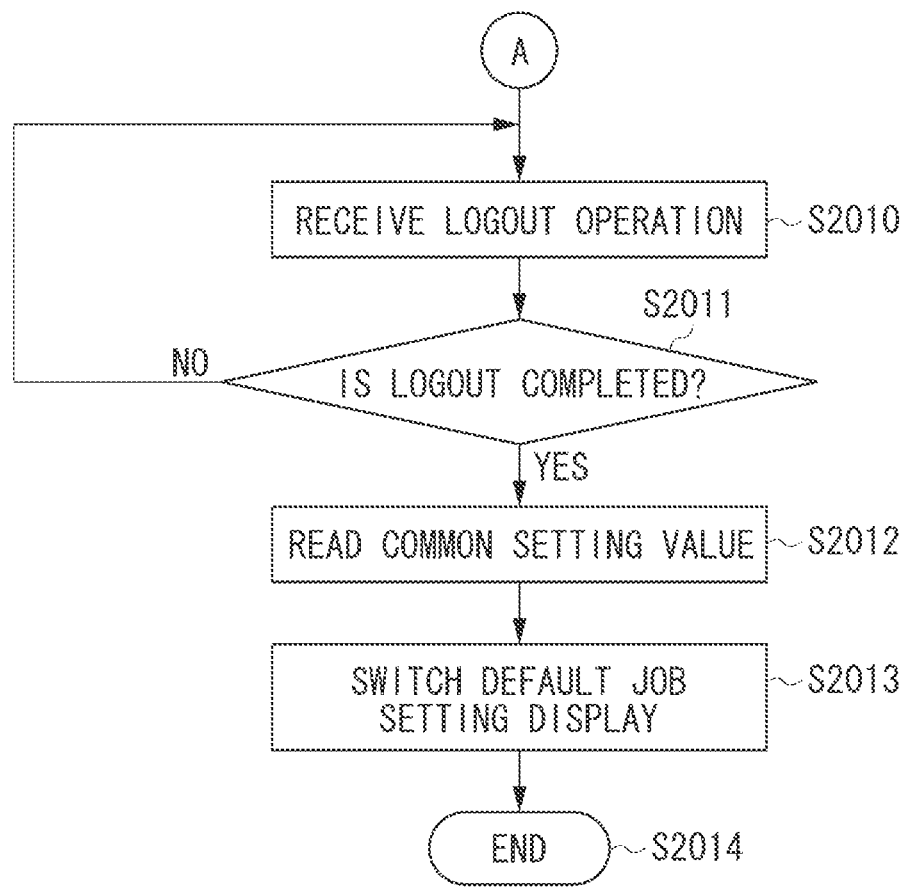

FIG. 19 is a flowchart illustrating an example of switching processing for a default job setting in the copy function, executed by the image forming apparatus 200 according to the present exemplary embodiment. Each processing in the flowchart in FIG. 19 is implemented in such a manner that the CPU 2001 of the image forming apparatus 200 executes a control program stored in the ROM 2003 or the HDD 2004. Here, a case is described where the switching processing is executed in a state where the setting information illustrated in FIGS. 7A to 7D is registered in the setting DB 430.

In step S2000, the display operation control unit 401 starts the processing in the state where an operation can be received via the liquid crystal display unit 301.

Processing from steps S2001 to S2003 is the same as the processing from steps S1601 to S1603, and thus will not be described.

In step S2004, the customize control unit 450 determines whether the setting value of "change default setting" is read as the personal setting value. In a case where the customize control unit 450 determines that the item 1301d of the customize setting for "change default setting" is ON (register personal setting value) in the detail customize setting screen 1300, the processing proceeds to step S2005. On the other hand, in a case where the customize control unit 450 determines that the item 1301d is OFF (not register personal setting value) in the detail customize setting screen 1300, the processing proceeds to step S2008.

Processing in step S2005 is the same as the processing in step S1605, and thus will not be described.

In step S2006, the setting value storing control unit 403 determines whether there is a personal setting value registered with a key "copy default setting" in the setting DB 430, by targeting the user name of the user identifier issued in step S2005. In a case where the setting value storing control unit 403 determines that such a personal setting value exists, the processing proceeds to step S2007. In step S2007, the setting value storing control unit 403 obtains the personal setting value from the setting DB 430. On the other hand, in a case where the setting value storing control unit 403 determines that such a personal setting value does not exist, the processing proceeds to step S2008. In step S2008, the setting value storing control unit 403 obtains the common setting value from the setting DB 430. According to the example illustrated in FIGS. 7A to 7D, in a case where the target is the "user A", a personal setting value "color: full color, page aggregation: 2 in 1" corresponding to the key "copy default setting" exists. Thus, in step S2007, the setting value storing control unit 403 obtains a setting value "copy default setting—color: full color, page aggregation: 2 in 1". On the other hand, in a case where the target is the "user B", no personal setting value corresponding to the key "copy default setting" is registered. Thus, in step S2008, the setting value storing control unit 403 obtains a setting value "copy default setting—duplex: duplex from two-page spread, finishing: group" which is the common setting value. The setting value storing control unit 403 obtains the common setting value from the setting DB 430 also in a case where the processing in step S2008 is executed after the processing in step S2003 or S2004.

In step S2009, the customize control unit 450 reflects the setting value of the default setting information in the copy function acquired in step S2007 or step S2008 on the operation unit 2012, at the timing of when the copy job setting screen 900 is displayed on the operation unit 2012.

Thus, the customize control unit 450 executes the switching processing for the default setting.

Processing in step S2010 and step S2011 is the same as the processing in step S1610 and step S1611, and thus will not be described.

When the user has completed the logout and thus is in the not logged in state, in step S2012 and step S2013, the processing of resetting the setting value of "copy default setting" to the common setting value is executed. According to the example in FIG. 7, in step S2012, the setting value storing control unit 403 acquires the common setting value "duplex: two-page spread → duplex, finishing: group" corresponding to the combination between "common" as the target and "copy default setting" as the key from the setting DB 430.

In step S2013, the customize control unit 450 reflects the common setting value obtained in step S2012 on the operation unit 2012, at the timing of when the copy job setting screen 900 is displayed on the operation unit 2012.

In step S2014, the customize control unit 450 ends the switching processing for the default setting.

Through the processing described above, the image forming apparatus 200 can switch between reflecting the common setting value and reflecting the personal setting value to a setting value of a setting item. More specifically, the image forming apparatus 200 can switch between reflecting the common setting value and reflecting the personal setting value, in accordance with whether the user is allowed to use the personal setting value and, in particular, whether the user is allowed to use the personal setting value for a setting item related to a function.

According to the present exemplary embodiment described above, the image forming apparatus 200 can switch between changing the common setting value and changing the personal setting value, in accordance with whether the user is allowed to use the personal setting value. The image forming apparatus 200 can set the customize restriction individually for setting items related to functions. Thus, the customize restriction can be set more in detail, whereby both the administrator and the general user can enjoy improved usability.

According to the first to the third exemplary embodiments, the image forming apparatus 200 determines whether the personal setting information can be registered immediately before an access to the setting DB 430 for the setting value is performed, when the setting value is registered and the display is switched. Thus, in a case where the image forming apparatus 200 registers the personal setting value for setting value registration, and then the administrator sets the customize setting so that the registering of the personal setting value is restricted, the image forming apparatus 200 may then obtain the common setting value when switching the display to reflect the common setting value on the display.

In a case where the personal setting value cannot be changed, the user can change the common setting value. However, further in a case where the administrator desires to set the common setting value unchangeable, only some users may be enabled to change the common setting value as in the second exemplary embodiment.

The image forming apparatus 200 may reset the common setting value to an initial value determined in advance by the administrator in a case where, for example, no operation has been performed for a predetermined period of time, after the general user temporarily changes the common setting value.

The method, in the image forming apparatus 200 having a customize function allowing a user to freely set initial setting values, for restricting the change of an item, for which the customization is restricted, as the personal setting value, and allowing the setting change as the common setting value. Thus, the setting change by the general user in a way unwanted by the administrator can be prevented from being performed. The user can use the image forming apparatus 200 by temporarily changing the common setting value, even in a case where the personal setting value cannot be changed. Thus, each user can operate the apparatus under a desired environment.

The present invention can be implemented by executing the following processing. Specifically, software (program) for implementing the function of the exemplary embodiments described above is supplied to a system or an apparatus via a network or various storage media, and a computer (or a CPU, a microprocessor unit (MPU), or the like) in the system or the apparatus reads and executes the program.

According to the exemplary embodiments described above, a technique for preventing the general user from changing a setting value in a way unwanted by the administrator and the like, without impairing the usability of the general user, can be provided.

The preferred exemplary embodiments of the present invention described above are not limited to a specific modes, and thus can be modified and changed in various ways without departing from the scope of the spirit of the present invention described in claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-051884 filed Mar. 14, 2014, which is hereby incorporated by reference herein in its entirety.

What is claimed is:

1. An image forming apparatus comprising:
   a display that displays an operation screen;
   a setting database (DB) that stores a first personal setting value, of a predetermined setting item, being registered in association with a first user and a second personal setting value, of the predetermined setting item, being registered in association with a second user, and a common setting value, of the predetermined setting item, being used in common by the first and second users, wherein the first and second personal setting values and the common setting value are used for displaying the operation screen;
   a memory that stores a set of instructions; and
   at least one processor that executes the instructions to:
      set permission or prohibition of registration of a personal setting value of the predetermined setting item in accordance with an operation performed by an administrator user having an administrator authority;
      perform login processing to allow a general user having no administrator authority to log in the image forming apparatus;
      receive, from the first user having logged in the image forming apparatus or the second user having logged in the image forming apparatus, a register instruction for registering a setting value of the predetermined setting item; and
      store the setting value, specified in the register instruction, in the setting DB as the first personal setting value in a case where the register instruction from the first user is received in a state where the permission of registration of the personal setting value of the predetermined setting item is set, store the setting value, specified in the register instruction, in the setting DB as the second personal setting value in a case where the register instruction from the second user is received in a state where the permission of registration of the personal setting value of the predetermined setting item is set, and store the setting value, specified in the register instruction, in the setting DB as the common setting value in a case where the register instruction from the first user or the second user is received in a state where the prohibition of registration of the personal setting value of the predetermined setting item is set.

2. The image forming apparatus according to claim 1, wherein the permission or prohibition of registration of the personal setting value can be set for each of a plurality of the setting items.

3. The image forming apparatus according to claim 2, wherein, for some of the plurality of the setting items, common setting value is changeable by the administrator user in a case where the permission is set.

4. The image forming apparatus according to claim 1, wherein the display displays a first setting screen for setting permission or prohibition of registration of the personal setting value in accordance with an operation performed by the administrator user, and
   wherein the permission or the prohibition of registration of the personal setting value of the predetermined item is set in accordance with the operation via the first setting screen.

5. The image forming apparatus according to claim 4, wherein the display displays a second setting screen for setting, for each of a plurality of the setting items, permission or prohibition of registration of the personal setting value.

6. The image forming apparatus according to claim 1, wherein the predetermined setting item is a display language of the operation screen displayed by the display.

7. The image forming apparatus according to claim 1, wherein the predetermined setting item is an initial screen displayed in response to startup of the image forming apparatus.

8. The image forming apparatus according to claim 1, wherein the at least one processor executes the instructions to:
   execute a copy job,
   wherein the operation screen is a screen on which setting information of the copy job to be executed is displayed, and
   wherein the setting item is default setting information of the copy job.

9. The image forming apparatus according to claim 1, wherein the common setting value is changeable by the user only when the prohibition is set.

10. The image forming apparatus according to claim 1, wherein the at least one processor executes the instructions to:
   read from the setting DB the first personal setting value and control the display to display an operation screen based on the read first personal setting value in a case where the first user logs in the image forming apparatus in a state where the permission of registration of the personal setting value of the predetermined setting item is set, read from the setting DB the second personal setting value and control the display to display an operation screen based on the read second personal setting value in a case where the second user logs in the image forming apparatus in a state where the permission of registration of the personal setting value of the predetermined setting item is set, and read from the setting DB the common setting value and control the display to display an operation screen based on the read common setting value in a case where the first user or second user logs in the image forming apparatus in a state where the prohibition of registration of the personal setting value of the predetermined setting item is set.

11. The image forming apparatus according to claim 10, wherein the at least one processor executes the instructions to:
read, from the setting DB, the common setting value and control the display to display an operation screen based on the read common setting value in a case where the first user having logged in to the image processing apparatus or the second user having logged in to the image processing apparatus has logged out regardless of whether the permission of registration of the personal setting value of the predetermined setting item is set or the prohibition of registration of the personal setting value of the predetermined setting item is set.

12. An information processing method executed by an image forming apparatus including a display for displaying an operation screen and a memory for storing a first personal setting value, of a predetermined setting item, being registered in association with a first user and a second personal setting value, of the predetermined setting item, being registered in association with a second user, and a common setting value, of the predetermined setting item, being used in common by the first and second users, the method comprising:
setting permission or prohibition of registration of a personal setting value of the predetermined setting item in accordance with an operation performed by an administrator user having an administrator authority;
receiving, from the first user having no administration authority and having logged in the image forming apparatus or the second user having no administration authority and having logged in the image forming apparatus, a register instruction for registering a setting value of the predetermined setting item; and
store the setting value in the memory as the first personal setting value in a case where the register instruction from the first user is received in a state where the permission of registration of the personal setting value of the predetermined setting item is set, store the setting value in the memory as the second personal setting value in a case where the register instruction from the second user is received in a state where the permission of registration of the personal setting value of the predetermined setting item is set, and store the setting value in the memory as the common setting value in a case where the register instruction from the first user or the second user is received in a state where the prohibition of registration of the personal setting value of the predetermined setting item is set.

13. A non-transitory storage medium storing a program comprising instructions that, when executed by a computer of an image forming apparatus including a display for displaying an operation screen and a memory for storing a first personal setting value, of a predetermined setting item, being registered in association with a first user and a second personal setting value, of the predetermined setting item, being registered in association with a second user, and a common setting value, of the predetermined setting item, being used in common by the first and second users, cause the computer to perform operations comprising:
setting permission or prohibition of registration of a personal setting value of the predetermined setting item in accordance with an operation performed by an administrator user having an administrator authority;
receiving, from the first user having no administration authority and having logged in the image forming apparatus or the second user having no administration authority and having logged in the image forming apparatus, a register instruction for registering a setting value of the predetermined setting item; and
store the setting value in the memory as the first personal setting value in a case where the register instruction from the first user is received in a state where the permission of registration of the personal setting value of the predetermined setting item is set, store the setting value in the memory as the second personal setting value in a case where the register instruction from the second user is received in a state where the permission of registration of the personal setting value of the predetermined setting item is set, and store the setting value in the memory as the common setting value in a case where the register instruction from the first user or the second user is received in a state where the prohibition of registration of the personal setting value of the predetermined setting item is set.

* * * * *